United States Patent
Inoue et al.

(10) Patent No.: US 6,663,760 B2
(45) Date of Patent: *Dec. 16, 2003

(54) METHOD OF FABRICATING TWO-TERMINAL NONLINEAR ELEMENT USING NON-AQUEOUS ELECTROLYTE

(75) Inventors: Takashi Inoue, Kariya (JP); Takeyoshi Ushiki, Shiojiri (JP); Takumi Seki, Misato-mura (JP); Makoto Ue, Ami (JP); Fumikazu Mizutani, Ami-machi (JP); Sachie Takeuchi, Toride (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/117,681

(22) PCT Filed: Dec. 4, 1997

(86) PCT No.: PCT/JP97/04436

§ 371 (c)(1),
(2), (4) Date: Sep. 15, 1998

(65) Prior Publication Data

US 2001/0053452 A1 Dec. 20, 2001

(30) Foreign Application Priority Data

Dec. 6, 1996 (JP) ............................................. 8-342423
Dec. 6, 1996 (JP) ............................................. 8-342424
Dec. 6, 1996 (JP) ............................................. 8-342425
Dec. 6, 1996 (JP) ............................................. 8-342426
Mar. 28, 1997 (JP) ............................................. 9-094892

(51) Int. Cl.[7] .............................................. C25D 11/26

(52) U.S. Cl. ........................ 205/122; 205/124; 205/234; 205/322

(58) Field of Search ........................ 252/62.2; 429/202, 429/205, 326, 341, 329, 337; 361/505, 506, 504, 503; 205/234, 322, 122, 124

(56) References Cited

U.S. PATENT DOCUMENTS 4,245,278 A * 1/1981 Finkelstein et al. ........ 252/62.2
4,734,821 A * 3/1988 Morimoto et al. .......... 361/433

(List continued on next page.)

FOREIGN PATENT DOCUMENTS

EP 54989 * 12/1980

(List continued on next page.)

OTHER PUBLICATIONS

T. Hirai et al., *Afterimage Improvement for Thin–Film Diode (TFD) Liquid–Crystal Display Utilizing Tanatalum Anodic Oxidation in Ammonium Borate Solution*, Jpn. J. Appl. Phys., vol. 31, Part 1, No. 12B, pp. 4582–4585, (1992). Month of Publication not Available.

*Primary Examiner*—Roy King
*Assistant Examiner*—William T. Leader
(74) *Attorney, Agent, or Firm*—Oliff & Berridge, PLC

(57) ABSTRACT

A non-aqueous electrolyte comprises an organic solvent and a solute, and also has an electrolytic conductivity that is greater than or equal to 1 mS/cm but less than or equal to 100 mS/cm. This solute preferably includes at least one of a carboxylate and a salt of inorganic oxoacid. In addition, the non-aqueous electrolyte preferably comprises water in a proportion of 1 to 10 wt %. In an MIM nonlinear element (20), an insulated film (24) is formed by anodic oxidation using the above non-aqueous electrolyte. In addition, the insulated film comprises at least one of carbon atoms and atoms of families 3 to 7 that were originally the central atoms of the salt of inorganic oxoacid, and has a relative permittivity of 10 to 25. With this MIM nonlinear element, the capacitance is sufficiently small, the steepness of the voltage-current characteristic is sufficiently large, and also the resistance is sufficiently uniform over a wide area.

15 Claims, 11 Drawing Sheets

U.S. PATENT DOCUMENTS

| | | | | |
|---|---|---|---|---|
| 4,786,429 A | * | 11/1988 | Mori et al. | 252/62.2 |
| 4,853,304 A | * | 8/1989 | Ebner et al. | 429/192 |
| 4,857,423 A | * | 8/1989 | Abraham et al. | |
| 5,294,560 A | | 3/1994 | Ono et al. | 437/47 |
| 5,338,472 A | * | 8/1994 | Yokoyama et al. | 252/62.2 |
| 5,457,599 A | * | 10/1995 | Kuwae et al. | 252/62.2 |
| 5,643,432 A | * | 7/1997 | Qiu | 205/50 |
| 5,733,661 A | * | 3/1998 | Ue et al. | 428/426 |
| 5,736,434 A | * | 4/1998 | Konuma et al. | 438/151 |
| 6,099,709 A | * | 8/2000 | Tanahashi et al. | 205/50 |

FOREIGN PATENT DOCUMENTS

| | | |
|---|---|---|
| JP | 52-149090 | 12/1977 |
| JP | A-57-122478 | 7/1982 |
| JP | A-2-831 | 1/1990 |
| JP | A-2-93433 | 4/1990 |
| JP | A-3-237435 | 10/1991 |
| WO | WO 94/18600 | 8/1994 |

* cited by examiner

US 6,663,760 B2

METHOD OF FABRICATING TWO-TERMINAL NONLINEAR ELEMENT USING NON-AQUEOUS ELECTROLYTE

TECHNICAL FIELD

This invention relates to a non-aqueous electrolyte for fabricating a two-terminal nonlinear element that is used as a switching element, a method of fabricating a two-terminal nonlinear element by using this non-aqueous electrolyte, a two-terminal nonlinear element obtained by this fabrication method, and a liquid crystal display panel using that element.

BACKGROUND ART

In an active matrix type of liquid crystal display device, a liquid crystal fills a space between an active matrix substrate, which is formed as a matrix array with a switching element provided for each pixel region, and a facing substrate provided with a color filter or the like. Predetermined image information can be displayed by controlling the alignment of the liquid crystal in each pixel region. In general, a three-terminal element such as a thin-film transistor (TFT) or a two-terminal element such as a metal-insulator-metal (MIM) type of nonlinear element (hereinafter called a "MIM element") is used as each of these switching elements. A switching element using a two-terminal element is considered to be better than a three-terminal element in that there is no cross-over shorting and the fabrication thereof can be simplified.

To implement a liquid crystal display panel with a high image quality that has good contrast, and also no discernible display unevenness, after-image, or image persistence within a liquid crystal display device using MIM elements, it is important to ensure that the characteristics of the MIM elements satisfy the following conditions:

(1) The capacitance of each MIM element must be sufficiently smaller than the capacitance of the liquid crystal display panel, (2) Changes with time in the voltage-current characteristic of the MIM element must be sufficiently small, (3) The symmetry of the voltage-current characteristic of the MIM element must be good, (4) The steepness of the voltage-current characteristic of the MIM element must be sufficiently high, and (5) The resistance of the MIM element must be sufficiently uniform over a wide area.

In other words, to increase the contrast, it is necessary to make the capacitance of the MIM component sufficiently small with respect to the capacitance of the liquid crystal display panel, and also ensure that the steepness of the voltage-current characteristic of the MIM component is sufficiently large. To ensure there is no discernible display unevenness, it is necessary to make the resistance of the MIM component sufficiently uniform over a wide area. To ensure there is no discernible after-image, it is necessary to make sure that the changes with time in the voltage-current characteristic of the MIM element are sufficiently small. Furthermore, to ensure there is no discernible image sticking, it is necessary to make sure that the changes with time in the voltage-current characteristic of the MIM element are sufficiently small, and also that the symmetry of the voltage-current characteristic of the MIM element is good.

In this case, "after-image" is a phenomenon that occurs when another image is displayed after a certain image has been displayed for several minutes, in which case the previous image can still be discerned. Similarly, "image sticking" is a phenomenon that occurs when another image is displayed after a certain image has been displayed for several hours, in which case the previous image can still be discerned. The phrase "the symmetry of the voltage-current characteristic is good" means that, when a current flows from the first conductive film to the second conductive film under a certain voltage and when a current flows from the second conductive film to the first conductive film, the difference in absolute values of these currents is sufficiently small.

Examples of documents that disclose techniques for MIM elements are listed below.

(a) Japanese Patent Application Laid-Open No. 52-149090 discloses an MIM element that is fabricated from a first conductive film of tantalum, an insulated film that is a metal oxide film formed by anodic oxidation of this first conductive film, and a second conductive film of chromium formed on a surface of this insulated film. The insulated film is formed to a uniform thickness without pinholes, by forming it by anodic oxidation of the surface of the first conductive film. Japanese Patent Application Laid-Open No. 57-122478 disclosed the use of a dilute aqueous solution of citric acid as the electrolyte for anodic oxidation.

These techniques do not necessarily ensure sufficient quality for the above characteristics (2) to (5) of the resultant MIM element. In other words, they are unsatisfactory from the viewpoints of changes with time, symmetry, and steepness of the voltage-current characteristic, and also the resistance of the element is not sufficiently uniform over a wide area. This means that it would be difficult to ensure a high level of contrast over a wide temperature range in a liquid crystal display device using such MIM elements, and there will be problems such as a tendency towards unevenness in the display.

(b) The international application PCT/JP94/00204 (International Publication No. WO94/18600) discloses a configuration in which is used a film of an alloy of tantalum to which tungsten is added, as the first conductive film of the MIM element.

Since the first conductive film of the MIM element produced by this technique is a film of an alloy comprising tantalum and a specific element such as tungsten, instead of tantalum alone, this provides an improvement over the techniques disclosed in the documents of (a) with respect to characteristics (2) and (3), in other words, the changes with time and the symmetry of the voltage-current characteristic of the MIM element, so it is capable of improving quality to a level at which after-images cannot be discerned, and also of maintaining a good contrast over a wide temperature range. However, this technique has a problem concerning insufficient margin in the contrast characteristics required of such an element at high temperatures.

(c) Jpn. J. Appl. Phys, 31,4582 (1992) discloses the use of a dilute aqueous solution of phosphoric acid or ammonium borate as the electrolyte for the anodic oxidation used for forming the insulated film of an MIM element.

This technique provides an improvement over the techniques disclosed in the documents of (a) with respect to characteristics (2) and (3), in other words, the changes with time and the symmetry of the voltage-current characteristic of the MIM element, so it is capable of improving quality to a level at which after-images cannot be discerned, and also of maintaining a good contrast over a wide temperature range. However, this also has problems in that the reliability of the resultant elements is low, they are likely to be destroyed by short-circuiting, and display unevenness easily occurs.

(d) Japanese Patent Application Laid-Open No. 2-93433 discloses a configuration in which a film of an alloy of tantalum and silicon is used as the first conductive film of the MIM element.

This technique made it possible to improve the steepness of the voltage-current characteristic in comparison with the techniques of the documents of (a), and also provide sufficient margin over a wide temperature range to ensure a high contrast. However, this technique also has problems in that the reliability of the element is low and thus it can easily be destroyed, and display unevenness can easily occur.

DISCLOSURE OF THE INVENTION

An objective of this invention is to provide a two-terminal nonlinear element that satisfies all the characteristics (1) to (5) required of the above described MIM element, particularly a capacitance that is sufficiently small, a voltage-current characteristic with a sufficiently large steepness, and a resistance that is sufficiently uniform over a wide area; and also a liquid crystal display panel that uses this two-terminal nonlinear element and has a high image quality with a good contrast and no display unevenness.

Another objective of this invention is to provide a non-aqueous electrolyte for fabricating a two-terminal nonlinear element having the above described superior characteristics, as well as a fabrication method using that electrolyte.

As used herein, the term "non-aqueous" refers to the primary character of the electrolyte, meaning that the electrolyte is not an aqueous electrolyte comprising a substantial portion of water. That is, the "non-aqueous" electrolyte comprises an organic solvent and solute. The electrolyte can also include water, in an amount of from 1 to 10 wt %, while still being a "non-aqueous" electrolyte.

The non-aqueous electrolyte for fabricating a two-terminal nonlinear element (hereinafter called a "MIM nonlinear element") in accordance with a first aspect of this invention comprises an organic solvent and solute, and also has an electrolytic conductivity that is greater than or equal to 1 mS/cm but less than or equal to 100 mS/cm, but is preferably greater than or equal to 1 mS/cm but less than or equal to 10 mS/cm.

Using this electrolyte to perform anodic oxidation on the first conductive film, which is formed on the substrate of tantalum or a tantalum alloy, makes it possible to form an oxide film which has a uniform film quality and which also has a thickness that is sufficiently uniform over the entire surface of the substrate. Therefore, an MIM nonlinear element obtained by anodic oxidation using this electrolyte has a resistance that is sufficiently uniform over a wide area. In an MIM nonlinear element in accordance with this invention, the material of the second conductive film is not limited to a metal; the definition thereof also comprises a conductive film of a material such as indium tin oxide (ITO).

The permeation of the solute or solvent, or both solute and solvent, into the oxide film during the anodic oxidation makes it possible to reduce the relative permittivity of the oxide film (insulated film) to within a suitable range. As a result, the thus obtained MIM nonlinear element has a capacitance that is sufficiently small, and also the steepness of the voltage-current characteristic thereof is high.

The solute may comprise at least one of a carboxylate and a salt of inorganic oxoacid.

This carboxylate may be at least one salt of carboxylic acids selected from the group of aromatic carboxylic acids and aliphatic dicarboxylic acids having no hydroxyl groups. This carboxylate is preferably an aromatic carboxylate, and at least one of salicylate and phthalate is particularly preferable.

The central atom of the oxoacid in the salt of inorganic oxoacid may be an atom belonging to one of Groups IIIA, IIIB, IVA, IVB, VA, VB, VIA, VIB, VIIA, and VIIB (CAS version) of the periodic table. In addition, this salt of inorganic oxoacid may be at least one type selected from the group of nitrates, vanadates, phosphates, chromates, tungstates, molybdates, silicates, perrhenates, borates, and sulfates. A tungstate is preferable as this salt of inorganic oxoacid, and at least one type of primary, secondary, tertiary, and quaternary ammonium salt is particularly preferable.

The non-aqueous electrolyte of this invention comprises an organic solvent and a solute, and it may also comprise water where the proportion thereof with respect to the electrolyte is preferably 1 to 10 wt %.

This organic solvent may be at least one of ethylene glycol and γ-butyrolactone.

An MIM nonlinear element in accordance with a second aspect of this invention comprises a first conductive film, insulated film, and second conductive film deposited in sequence on a substrate, wherein the first conductive film is of tantalum or a tantalum alloy; and wherein the insulated film is formed by anodic oxidation of the first conductive film, comprises carbon atoms or at least one type of element belonging to at least one of Groups IIIA, IIIB, IVA, IVB, VA, VB, VIA, VIB, VIIA, and VIIB of the periodic table and originating from the central atom of an inorganic oxoacid, and also has a relative permittivity of 10 to 25. The relative permittivity of the insulated film may be more preferably 22 to 25, to ensure sufficiently small changes with time in the MIM nonlinear element.

The carbon atoms or at least one type of element belonging to at least one of families 3 to 7 of the periodic table and originating from the central atom of an inorganic oxoacid, comprised within the insulated film, may be distributed through the entire thickness direction of the insulated film.

The relative intensity of these carbon atoms with respect to oxygen atoms ($^{18}O$) may be 0.2 to 1000 throughout the entire thickness direction of the insulated film, and more preferably 0.2 to 100, as determined by elemental analysis obtained by secondary ion mass spectrometry (SIMS) by irradiation of cesium primary ions.

The relative intensity of this at least one element in the insulated film belonging to Groups IIIA, IIIB, IVA, IVB, VA, VB, VIA, VIB, VIIA, and VIIB; of the periodic table may be at least 10 times the intensity of the element in the first conductive film, as determined by elemental analysis obtained by SIMS.

The insulated film of the MIM nonlinear element in accordance with this invention is obtained by anodic oxidation of the first conductive film in the non-aqueous electrolyte of this invention. The relative permittivity of the insulated film can be reduced to a suitable range by the permeation of the solute or solvent, or both the solute and solvent, into the oxide film during the anodic oxidation, which causes at least carbon atoms or at least one element belonging to Groups IIIA, IIIB, IVA, IVB, VA, VB, VIA, VIB, VIIA, and VIIB of the periodic table and originally the central atoms of an inorganic oxoacid to become incorporated into the oxide film (insulated film). As a result, the MIM nonlinear element of this invention has superior characteristics such as a low capacitance and a large steepness of the voltage-current characteristic thereof.

A liquid crystal display panel in accordance with a third aspect of this invention includes the above described MIM nonlinear element. More specifically, it comprises a first substrate provided with a transparent substrate, one type of signal line disposed in a predetermined pattern on the substrate, a MIM nonlinear element in accordance with this invention, connected at a predetermined pitch to this signal line, and a pixel electrode connected to the MIM nonlinear element; a second substrate provided with another type of signal line positioned opposite to the pixel electrode; and a liquid crystal layer interposed between the first substrate and the second substrate. This liquid crystal display panel has a good contrast, is not likely to develop problems such as display unevenness, and therefore makes it possible to provide a high-quality image display such that it can be applied to a wide range of applications.

BEST MODE FOR CARRYING OUT THE INVENTION

Preferred embodiment of this invention is described below with reference to the accompanying drawings.

MIM Nonlinear Element and Liquid Crystal Display Panel

Figure 1:
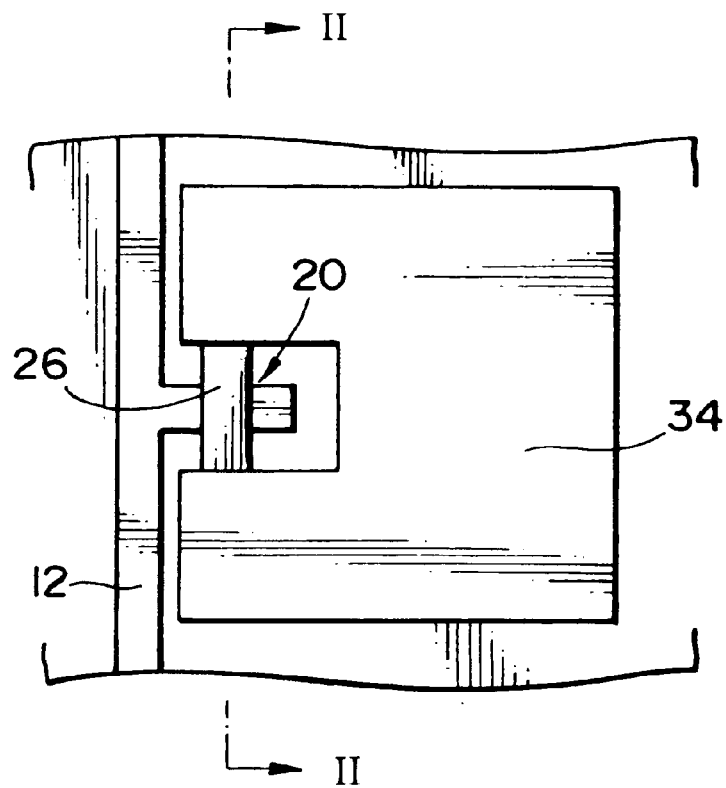
FIG. 1 is a plan view of an essential component of a liquid crystal display panel in which is used an MIM nonlinear element of this invention.
Figure 2:
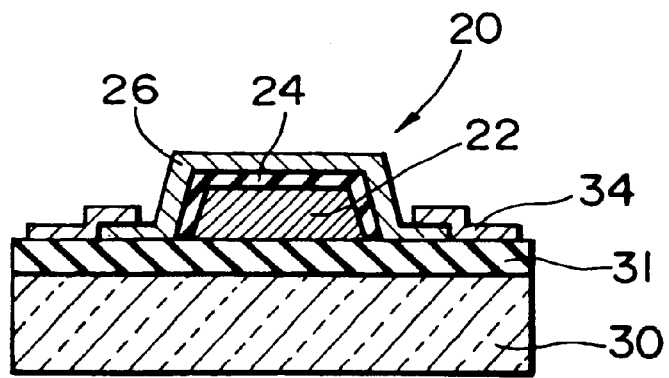
FIG. 2 is a cross-sectional view taken along the line II—II of FIG. 1.

A schematic plan view of a single liquid crystal drive electrode using the MIM nonlinear element of this invention is shown in FIG. 1, with a schematic cross-sectional view thereof taken along the line II—II in FIG. 1 being shown in FIG. 2.

This MIM nonlinear element 20 is configured of a substrate (first substrate) 30 formed of a material having insulating properties as well as transparency, such as glass or plastic; an insulated film 31 formed on a surface of the substrate 30; a first conductive film 22 formed of tantalum or a tantalum alloy; an insulated film 24 formed by anodic oxidation of a surface of the first conductive film 22; and a second conductive film 26 formed on a surface of the insulated film 24. The first conductive film 22 of this MIM nonlinear element 20 is connected to a signal line (scan line or data line) 12 and the second conductive film 26 is connected to a pixel electrode 34.

The insulated film 31 is formed of a material such as tantalum oxide. This insulated film 31 is formed with the objectives of ensuring that there is no peeling of the first conductive film 22 due to heat treatment after the second conductive film 26 has been superimposed thereon, and also to prevent dispersion of impurities from the substrate 30 to the first conductive film 22. If these problems are not likely to occur, however, this film is not necessary.

The first conductive film 22 could be of tantalum alone, or it could be an alloy film having tantalum as the main component and comprising an element from groups 6, 7, and 8 of the periodic table. Preferable examples of the element added to this alloy could be tungsten, chromium, molybdenum, rhenium, yttrium, lanthanum, or dysprosium. Tungsten is particularly preferable as this added element, with the proportion thereof being 0.2 to 6 atom %, for example.

The insulated film 24 is formed by anodic oxidation in a specific non-aqueous electrolyte, as will be described later. This insulated film 24 comprises the added element comprised with the first conductive film 22 and also at least one substance taken from the organic solvent and solute within the electrolyte, preferably comprising carbon atoms and/or the central atom of salt of an inorganic oxoacid, or hydrogen. By adding carbon atoms or the central atom of the salt of inorganic oxoacid to the insulated film 24 in this manner, it is possible to make the relative permittivity of the insulated film 24 less than that of ordinary tantalum oxide. This relative permittivity is set to be 10 to 25, preferably 22 to 25. As a result, the capacitance of the MIM nonlinear element 20 can be made sufficiently small and also the steepness of the voltage-current characteristic thereof can be make sufficiently large.

The carbon atoms or the central atom of the salt of inorganic oxoacid comprised within the insulated film 24 are preferably distributed throughout the thickness direction of this insulated film 24, in other words, throughout the entire region from the boundary between the insulated film 24 and the first conductive film 22 to the boundary between the insulated film 24 and the second conductive film 26. By distributing the carbon atoms or the central atom of the salt of inorganic oxoacid throughout the insulated film 24 in this manner, it is possible to cause a change in the capacitance of the insulated film and also reduce the relative permittivity of the insulated film.

The profile of these carbon atoms can be confirmed by a method such as secondary ion mass spectrometry (SIMS) by cesium ion etching. With this analysis method, the relative intensity thereof with respect to oxygen atoms ($^{18}O$) is preferably 0.2 to 1000 throughout the entire thickness direction of this insulated film 24; more preferably 0.2 to 100.

The profile of the element belonging to any of groups 3 to 7, which originates from this central atom of the salt of inorganic oxoacid, can be confirmed by SIMS by irradiation of cesium primary ions or the like. With this analysis method, the intensity of this element belonging to groups 3 to 7 of the periodic table in the insulated film is at least 10 times the intensity thereof in the first conductive film; more preferably 10 to 10000 times that intensity. The intensity within this first conductive film can be specified as an average value of intensity (as, for example, the number of secondary ions) within a region of the first conductive film where the profile of that particular element is substantially constant.

Note that the boundary between the insulated film and the first conductive film is defined in this analysis method as a surface corresponding to the intermediate point between the intensity of $^{18}O$ in the insulated film and the intensity of $^{18}O$ in the first conductive film, from the $^{18}O$ profile obtained by SIMS, for example.

The second conductive film 26 is not particularly limited, but it is usually formed of chromium. Similarly, the pixel electrode 34 is formed as a transparent conductive film of a material such as indium tin oxide (ITO).

Figure 3:
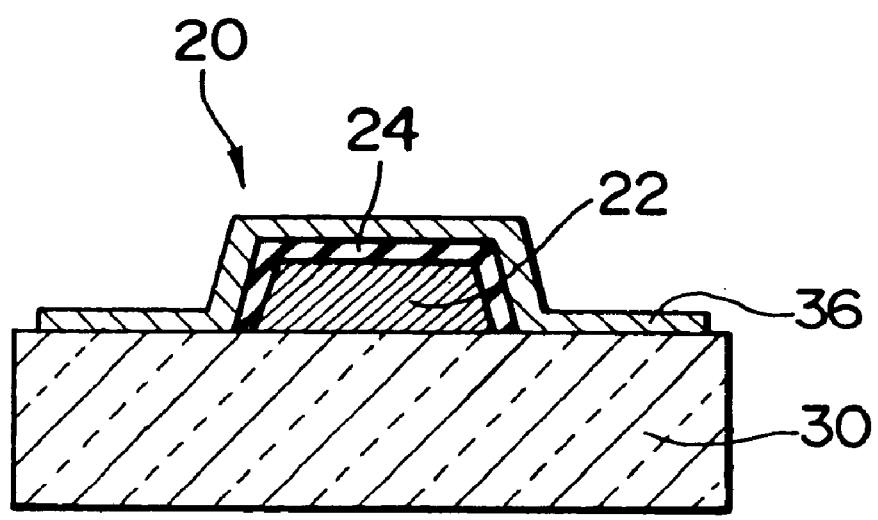
FIG. 3 is a cross-sectional view through another example of an MIM nonlinear element of this invention.

In addition, the second conductive film and the pixel electrode can be formed from the same transparent conductive film 36, as shown in FIG. 3. This use of the same film for both the second conductive film and the pixel electrode makes it possible to reduce the number of fabrication steps required for film formation.

The description now turns to an example of a liquid crystal display panel in which this MIM nonlinear element 20 is used.

Figure 4:
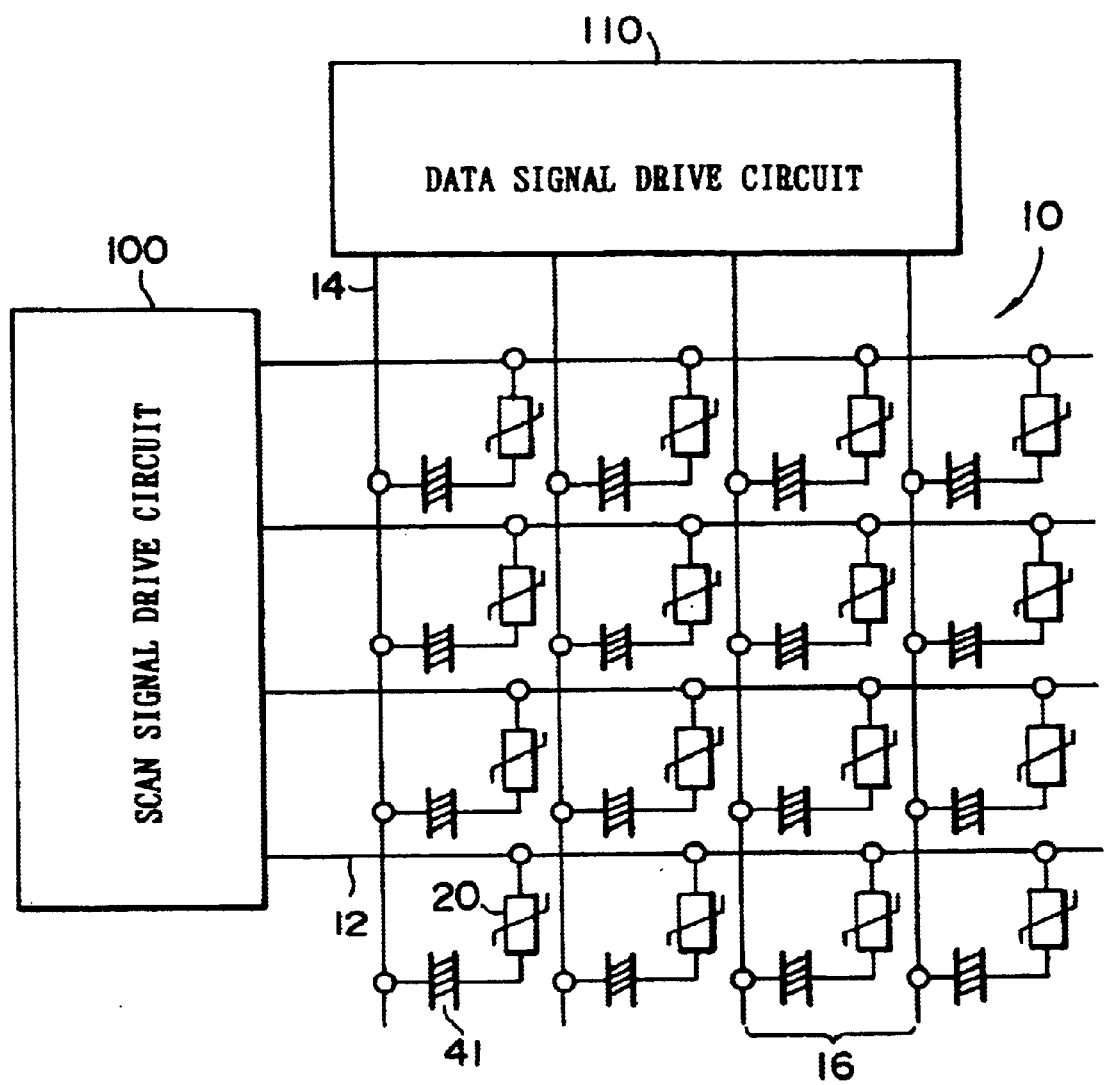
FIG. 4 shows an equivalent circuit of the liquid crystal display panel of this invention.

A typical equivalent circuit of an active matrix type of liquid crystal display panel using this MIM nonlinear element 20 is shown in FIG. 4. This liquid crystal display panel 10 comprises a scan signal drive circuit 100 and a data signal drive circuit 110. The liquid crystal display panel 10 is provided with signal lines, in other words, a plurality of scan lines 12 and a plurality of data lines 14, where the scan lines 12 are driven by the scan signal drive circuit 100 and the data lines 14 are driven by the data signal drive circuit 110. At each of a plurality of pixel regions 16, the MIM nonlinear element 20 and a liquid crystal display element (liquid crystal layer) 41 are connected in series between a scan line 12 and a data line 14. Note that in FIG. 4 the MIM nonlinear element 20 is shown connected to the scan line 12 side and the liquid crystal display element 41 is shown connected to the data line 14 side, but the opposite configuration in which the MIM nonlinear element 20 is connected to the data line 14 side and the liquid crystal display element 41 is connected to the scan line 12 side is also possible.

Figure 5:
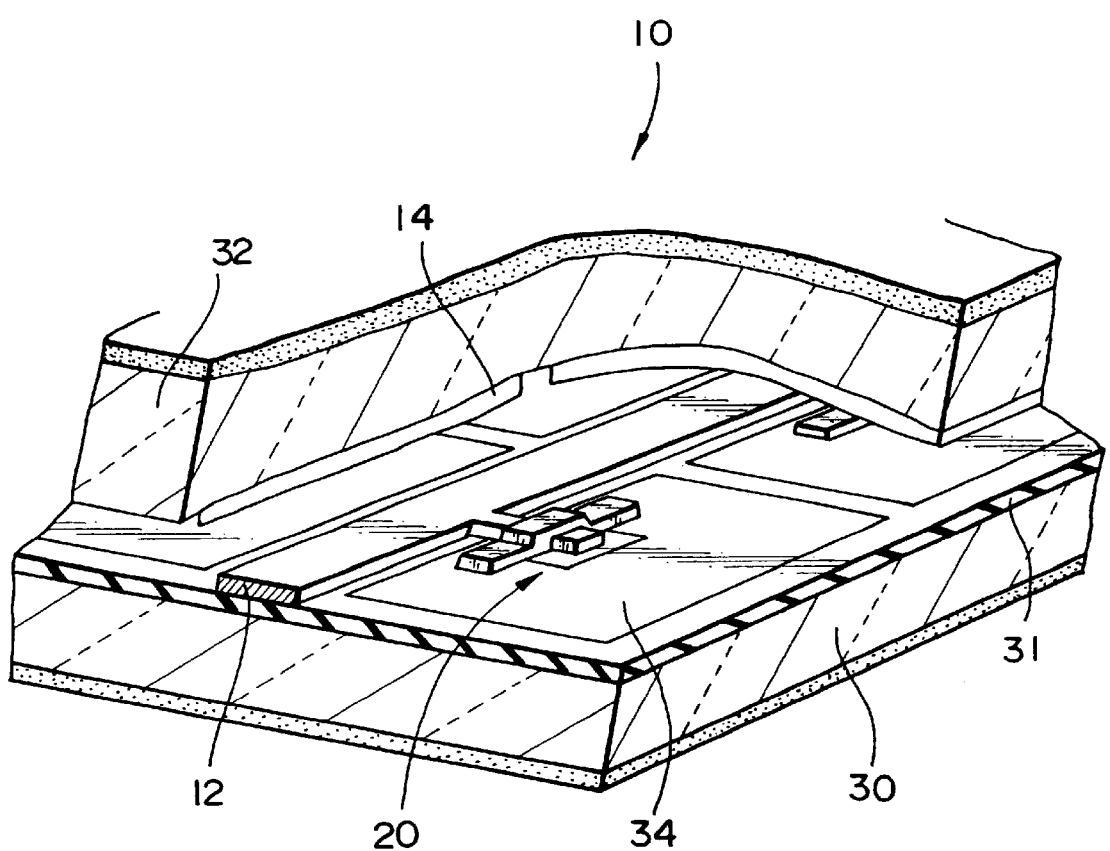
FIG. 5 is a perspective view of a liquid crystal display panel in accordance with this invention.

A schematic perspective view of an example of the configuration of a liquid crystal display panel in accordance with this embodiment is shown in FIG. 5. This liquid crystal display panel 10 is provided with two opposing substrates, in other words, a first substrate 30 and a second substrate 32, with a liquid crystal filling the space between the substrates 30 and 32. The insulated film 31 is formed on the first substrate 30, as previously described. The plurality of signal lines (scan lines) 12 are provided on the surface of this insulated film 31. The plurality of data lines 14 are formed in strips on the second substrate 32 in such a manner as to cross the scan lines 12. Each pixel electrode 34 is connected to a scan line 12 by the corresponding MIM element 20.

The display behavior of the liquid crystal display element 41 is controlled by switching it to a display state, a non-display state, or an intermediate state, based on signals applied to the scan line 12 and data line 14. Any generally-used method can be used for controlling this display behavior.

Figure 6:
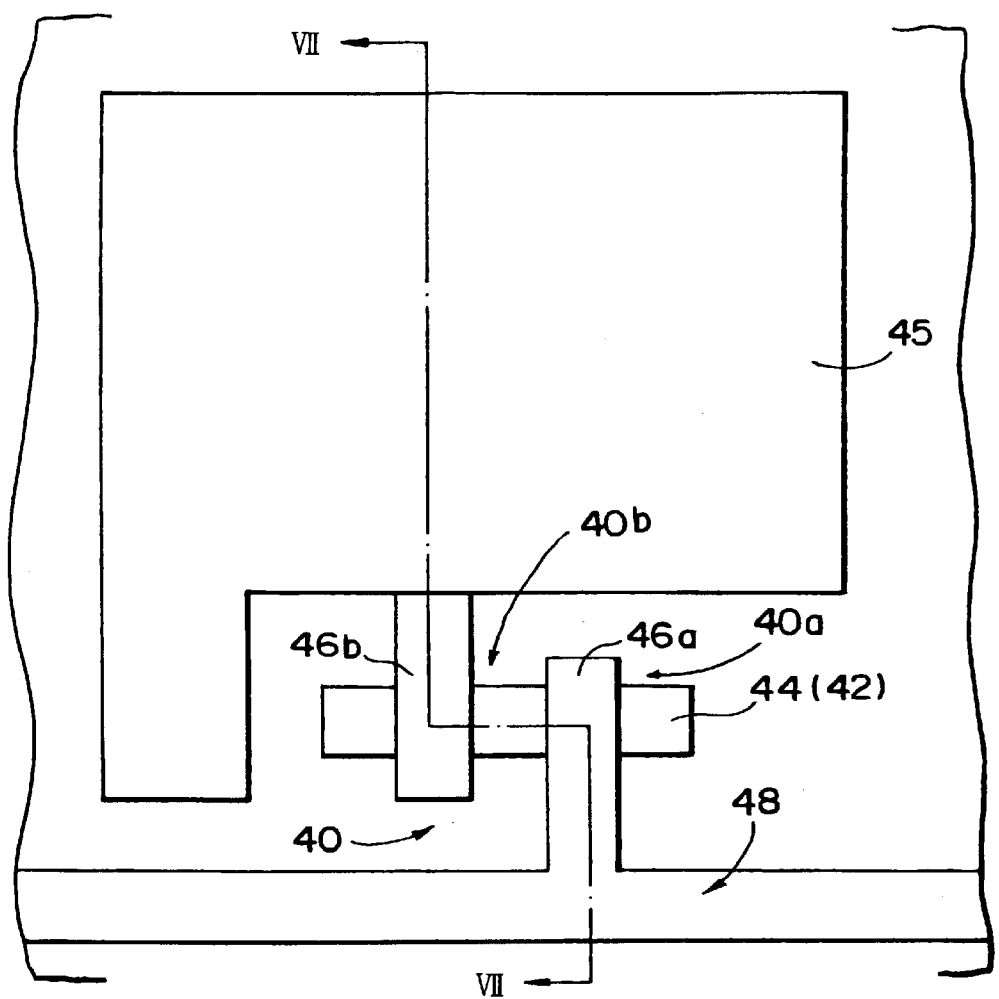
FIG. 6 is a plan view of essential components of a liquid crystal display panel to which another MIM nonlinear element in accordance with this invention is applied.
Figure 7:
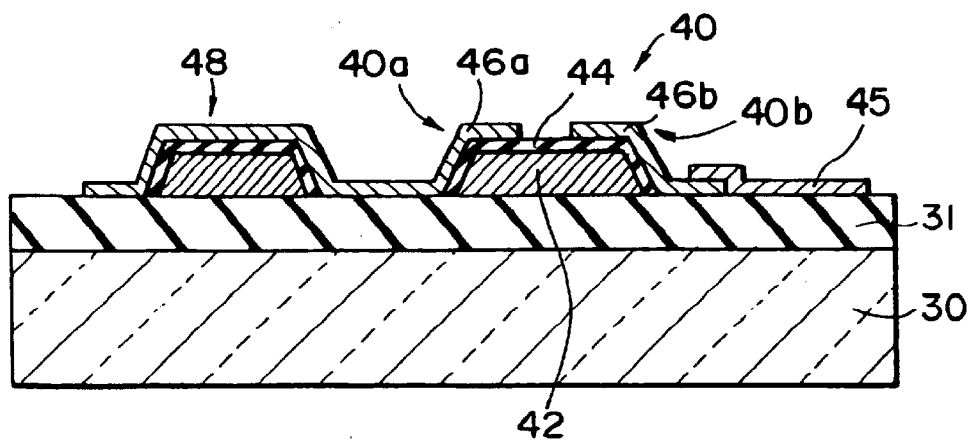
FIG. 7 is a cross-sectional view taken along the line VII—VII in FIG. 6.

Another embodiment of the MIM nonlinear element is shown in FIGS. 6 and 7. FIG. 6 is a schematic plan view of a single liquid crystal drive electrode using the MIM nonlinear element of this embodiment, and FIG. 7 is a schematic cross-sectional view taken along the line VII—VII of FIG. 6.

This MIM nonlinear element 40 differs from the previously described MIM nonlinear element 20 in having a back-to-back structure. In other words, the MIM nonlinear element 40 has a configuration in which a first MIM nonlinear element 40a and a second MIM nonlinear element 40b are connected in series but with opposite polarities.

More specifically, the MIM nonlinear element 40 is configured of a substrate (first substrate) 30 formed of a material having insulating properties as well as transparency, such as glass or plastic; an insulated film 31 formed on a surface of the substrate 30; a first conductive film 42 formed of tantalum; an insulated film 44 formed by anodic oxidation of a surface of the first conductive film 42; and two second conductive films 46a and 46b formed on a surface of the insulated film 44, but mutually isolated from one another. The second conductive film 46a of the first MIM nonlinear element 40a is connected to a signal line (either a scan line or a data line) 48 and the second conductive film 46b of the second MIM nonlinear element 40b is connected to a pixel electrode 45. The thickness of the insulated film 44 is set to be thinner than that of the insulated film 24 of the MIM nonlinear element 20 shown in FIGS. 1 and 2, such as, for example, approximately half the thickness thereof.

Electrolyte

The description now turns to details of the electrolyte used in the anodic oxidation of this invention.

The electrolyte of this invention is a non-aqueous electrolyte comprising an organic solvent and a solute. The electrolytic conductivity of the non-aqueous electrolyte is 1 to 100 mS/cm, preferably 1 to 10 mS/cm. In general, the electrolytic conductivity of the electrolyte depends on the concentration of the solute, such that a higher solute concentration gives a higher electrolytic conductivity, so it is preferable that the solute dissolves easily in the organic solvent.

This solute is not particularly limited and can be any salt of an organic acid or inorganic acid, but a carboxylate or a salt of inorganic oxoacid is preferable.

An example of this carboxylate could be at least one salt of carboxylic acid selected from aromatic carboxylic acids and aliphatic dicarboxylic acids having no hydroxyl groups, for example. The carboxylic acid is preferably one with a low molecular weight, having 2 to 8 carbon atoms.

Specific examples of aromatic carboxylic acids include: aromatic monocarboxylic acids such as benzoic acid, toluic acid, salicylic acid, and resorcylic acid; and aromatic dicarboxylic acids such as phthalic acid. Specific examples of aliphatic dicarboxylic acid having no hydroxyl groups include saturated carboxylic acids such as oxalic acid, malonic acid, succinic acid, glutaric acid, and adipic acid; and unsaturated carboxylic acids such as maleic acid and citraconic acid.

The salt of inorganic oxoacid is preferably a salt such that the central atom of the oxoacid is an atom belonging to any of Groups IIIA, IIIB, IVA, IVB, VA, VB, VIA, VIB, VIIA, and VIIB of the periodic table. The oxoacid could be one in which the central atom is not a metal, such as nitric acid, phosphoric acid, boric acid, silicic acid, or sulfuric acid; or it could be one in which the central atom is a metal, such as chromic acid, vanadic acid, tungstic acid, molybdic acid, or perrhenic acid. Furthermore, the oxoacid could be a polyacid. It may be even an iso-polyacid or a hetero-polyacid.

The cations forming the salt could be ammonium ions; alkaline metal ions; primary, secondary, tertiary, or quaternary alkylammonium ions; phosphonium ions; or sulfonium ions; but ammonium ions and primary, secondary, tertiary, or quaternary alkylammonium ions are particularly preferable. With alkylammonium ions, it is best to select the size of the alkyl group from consideration of solubility in the organic solvent.

The salt of organic acid as the solute is preferably ammonium salicylate, ammonium γ-resorcylate, ammonium benzoate, ammonium hydrogen phthalate, diammonium phthalate, ammonium malonate, ammonium adipate, or ammonium maleate; but ammonium salicylate, ammonium hydrogen phthalate, or diammonium phthalate is most preferable.

The salt of inorganic acid as the solute is preferably a tungstate. This tungstate could be an ortho-acid salt comprising a $WO_4^{2-}$ group, a para-acid salt comprising a $WO_6^{6-}$ group, or a polyacid salt which is a dehydration-condensate of the ortho-acid salt or para-acid salt.

The cation component of this tungstate is preferably an inorganic ion such as lithium, sodium, potassium, or ammonium; or an organic ion having an organic group such as one of primary, secondary, tertiary, or quaternary ammonium, phosphonium, or sulfonium. From considerations of solubility in the solvent, an organic ion is preferable, and from considerations of economy, a primary, secondary, tertiary, or quaternary ammonium compound is particularly preferable. From considerations of electrolytic conductivity, this primary, secondary, tertiary, or quaternary ammonium compound is preferably one in which the organic substituent is a hydrocarbon group with 1 to 4 carbon atoms; more preferably it is a heterocyclic ammonium compound in which alkyl groups are linked together.

Specific examples of such ammonium salts include: an aliphatic primary ammonium compound such as methylammonium or ethylammonium; an aliphatic secondary ammonium compound such as dimethylammonium or diethylammonium; an aliphatic tertiary ammonium compound such as trimethylammonium, dimethylethylammonium, methyldiethylammonium, or triethylammonium; an aliphatic heterocyclic tertiary ammonium compound such as 1-methylimidazolinium, 1,2-dimethylimidazolinium, 1-ethyl-2-methylimidazolinium, 1,2,4-trimethylimidazolinium, 1-methyl-1,4,5,6-tetrahydropyrimidinium, 1,2-dimethyl-1,4,5,6-tetrahydropyrimidinium, or 5-azonia-1, 5-diazabicyclo [4.3.0]nonene-5, 8-azonia-1,8-diazabicyclo[5.4.0] undecene-7; an aromatic heherocyclic tertiary ammonium compound such as pyridinium, 1-methylimidazolium, 1-ethylimidazolium, or 1,2-dimethylimidazolium; an aliphatic quaternary ammonium compound such as tetramethylammonium, timethylethylammonium, dimethylidiethylammonium, methyltriethylammonium, or tetraethylammonium; an aliphatic heterocyclic quaternary ammonium compound such as 1,1-dimethylpyrrolidinium, 1-methyl-1-ethylphrrolidinium, 1,1-diethylpyrrolidinium, 1,1-dimethylpiperidinium, 1-methyl-1-ethylpiperidinium, 1,1-diethylpiperidinium, 1,1-tetramethylenepyrrolidinium, 1,1-pentamethylenepyrrolidinium, 1,1-tetramethylenpiperidinium, 1,1-pentamethylenepiperidinium, 1,2,3-trimethylimidazolinium, 1,2,3,4-tetramethylimidazolinium, or 1-ethyl-2,3-dimethylimidazolinium; or an aromatic heterocyclic quaternary ammonium compound such as 1-ethylpyridinium, 1-butylpyridinium, 1,3-dimethylimidazolium, 1,2,3-trimethylimidazolium, 1-ethyl-3-methylimidazolium, or 1-ethyl-2,3-dimethylimidazolium.

Among these, salts of triethylmethylammonium and tetraethylammonium are particularly preferable from considerations of solubility and electrolytic conductivity.

The organic solvent could be at least one selected from the group of an alcohol-related solvent such as ethylene glycol or methyl cellosolve; a lactone-related solvent such as γ-butyrolactone, γ-valerolactone or δ-valerolactone; a carbonate-related solvent such as ethylene carbonate, propylene carbonate, or butylene carbonate; an amide-related solvent such as N-methylformamide, N-ethylformamide, N,N-dimethylformamide, N,N-diethylformamide, N-methylacetamide, N,N-dimethylacetamide, or N-methylpyrrolidinone; a nitrile-related solvent such as 3-methoxypropionitrile or glutaronitrile; a phosphate-related solvent such as trimethylphosphate or triethylphosphate; or a mixture thereof. A non-polar solvent such as hexane, toluene, or silicone oil could be added to any of these organic solvents.

Of the above described organic solvents, ethylene glycol and γ-butyrolactone are preferable, either alone or mixed.

The concentration of the solute is determined from considerations of the electrolytic conductivity of the electrolyte, and the quantity of solute to be incorporated into the anodic oxidation film, and pH of the electrolyte. The concentration of the carboxylate dissolved in the organic solvent, for example, is preferably 1 to 30 wt %; more preferably 1 to 10 wt %. The concentration of the salt of inorganic oxoacid dissolved in the organic solvent is preferably 1 to 30 wt %; more preferably 1 to 10 wt %.

It is further preferable that water is comprised within the electrolyte, in addition to the organic solvent and solute. The proportion of this water is preferably 1 to 10 wt %. If the solute is an aromatic carboxylate, the proportion of this water is preferably 3 to 10 wt %; more preferably 5 to 7 wt %. If the solute is a tungstate, the proportion of this water is preferably 1 to 10 wt %; more preferably 3 to 5 wt %.

If an aromatic carboxylate is used as the solute, the pH of the non-aqueous electrolyte as measured by a pH-meter is preferably 4 to 12, more preferably 4.5 to 10, and even more preferably 5 to 8. If the pH of the non-aqueous electrolyte is greater than 12, the oxide film will be likely to peel off; if the pH is less than 4, the electrolytic conductivity of the electrolyte will be too low, making it difficult to form a uniform oxide film. The salt of inorganic acid as the solute is most preferably a tungstate.

If the non-aqueous electrolyte comprises a tungstate, the pH thereof as measured by a pH-meter is preferably 8 to 13; more preferably 9 to 12. If the pH is greater than 13, the oxide film will be likely to peel off; if the pH is less than 8, the electrolytic conductivity of the electrolyte will be too low, making it difficult to form a uniform oxide film.

This invention makes it possible to increase the steepness of the voltage-current characteristic and also reduce the changes with time of the voltage-current characteristic, by the permeation of substances comprised within the solute, solvent, or both, such as tungsten atoms from within the solute and carbon atoms from within the solvent, into the oxide film during the anodic oxidation thereof.

By dissolving a substance such as a tungstate as the solute, it is possible to ensure that tungsten permeates at a suitable low concentration, more specifically at a concentration within the range of 0.001 to 0.5 atom %, and also uniformly into the oxide film obtained by the anodic oxidation. The reasons why this improves the steepness of the voltage-current characteristic and changes with time of the voltage-current characteristic are not absolutely clear, but it is thought to be because the tungsten alleviates the effects of excess oxygen in an anodic oxide film usually comprising more oxygen than stoichiometric composition of tantalum oxide ($Ta_2O_5$). It has been confirmed that the use of an organic solvent in the electrolyte ensures that the capacitance of the MIM nonlinear element is sufficiently small.

Fabrication of MIM Nonlinear Element

The description now turns to the method of fabricating the MIM nonlinear element 20 of FIG. 2. The fabrication method of this invention is characterized in that the first conductive film is subjected to anodic oxidation in a specific non-aqueous electrolyte.

This MIM nonlinear element 20 is fabricated by the process described below by way of example.

(a) First of all, the insulated film 31 is formed of tantalum oxide on the substrate 30. The insulated film 31 could be formed by, for example, thermal oxidation of a tantalum film deposited by sputtering, or by sputtering or co-sputtering using a target of tantalum oxide. This insulated film 31 is provided to improve the adhesiveness of the first conductive film 22 and also prevent diffusion of impurities from the substrate 30, so it is formed to a thickness of, for example, approximately 50 to 200 nm.

The first conductive film 22 is then formed of tantalum or a tantalum alloy on the insulated film 31. The thickness of the first conductive film is selected to be suitable for the utility of the MIM nonlinear element, and would ordinarily be on the order of 100 to 500 nm. This first conductive film could be formed by sputtering or electron beam deposition. As a method of forming the first conductive film from a tantalum alloy, sputtering with a mixed target, co-sputtering, electron beam deposition, or a similar method could be used. The other element comprised within the tantalum alloy could be selected from the previously described elements from groups 6, 7, and 8 of the periodic table, preferably tungsten, chromium, molybdenum, rhenium, or the like.

The first conductive film 22 is patterned by a generally-used photolithography and etching technique. The signal lines (scan lines or data lines) 12 are formed by the same fabrication step as that of the first conductive film 22.

(b) The surface of this first conductive film 22 is then oxidized by anodic oxidation to form the insulated film 24. During this process, the surfaces of the signal lines 12 are also oxidized to form the insulated film thereon. The thickness of this insulated film 24 is preferably selected from considerations of the utility thereof, and is, for example, on the order of 20 to 70 nm.

The anodic oxidation is performed within a temperature range at which the electrolyte is a stable liquid. This temperature range is generally −20° C. to 150° C., but is preferably room temperature to 100° C. The method used to control the current and voltage during the anodic oxidation is not specifically limited, but it is usual to perform anodic oxidation at a constant current up to a previously determined electrolytic voltage (Vf) then, after the electrolytic voltage Vf has been reached, maintain that voltage for a fixed time. The current density during this time is preferably 0.001 to 10 mA/cm²; more preferably 0.01 to 1 mA/cm². The electrolytic voltage Vf during the fabrication of the liquid crystal display panel also depends on the design of the drive circuit but it is usually 5 to 100 V; preferably 10 to 40 V.

The electrolyte used in the anodic oxidation is a non-aqueous electrolyte having a specific electrolytic conductivity, as described previously, and this electrolyte makes it possible to obtain an insulated film having uniform film thickness and characteristics within the substrate surface. During the anodic oxidation, at least one of the solute and solvent within the electrolyte permeates into the oxide film, such that the relative permittivity of the insulated film can be set to within a suitable range by the permeation into the oxide film of an element within the solute or solvent, preferably carbon and/or the central atom of the salt of inorganic oxoacid, or hydrogen.

(c) A film of a metal such as chromium, aluminum, titanium, or molybdenum is then deposited by a method such as sputtering, to form the second conductive film 26. The second conductive film is formed to a thickness of 50 to 300 nm, for example, and is subsequently patterned with generally-used photolithography and etching techniques. An ITO film is then deposited thereon to a thickness of 30 to 200 nm by a method such as sputtering, then the pixel electrode 34 is formed to a predetermined pattern by generally-used photolithography and etching techniques.

Note that the second conductive film and the pixel electrode in the MIM nonlinear element 20 shown in FIG. 3 are formed from the same transparent conductive film 36, which is an ITO film or the like. Since the second conductive film and the pixel electrode are formed in the same step in this case, it is possible to make the fabrication process simpler.

EXAMPLES

Specific examples of this invention are described in more detail below, together with.

Example 1

A 200-nm-thick tantalum film was deposited by sputtering on a glass substrate, to form a first conductive film. Using an ethylene glycol solution comprising 10 wt % of ammonium salicylate as the electrolyte, electrolysis at constant current was then performed at a current density of 0.1 mA/cm² until the voltage reached 30 V, followed by electrolysis at constant voltage at 30 V for approximately two hours, to subject the tantalum film to anodic oxidation. As a result, a tantalum oxide film of a thickness of approximately 50 nm was formed. Note that when a conductometer was used to measure the electric conductivity of the electrolyte it was found to be 2.74 mS/cm.

Heat treatment at 400° C. was then performed in an atmosphere of nitrogen, to stabilize the anodic oxide film (insulated film), then chromium was deposited by sputtering to a thickness of 150 nm on that insulated film to form the second conductive film, completing the MIM nonlinear element. The characteristics of the MIM nonlinear element were measured, as described below.

Relative Permittivity

The electrostatic capacity of an MIM nonlinear element having a 4-$\mu$m square pattern, fabricated by the above described method, was found to be 51 fF. Note that this electrostatic capacity was measured by connecting together 1000 of these 4-$\mu$m-square MIM nonlinear elements in parallel and applying an AC voltage with a frequency of 10 kHz thereto. The thickness of the insulated film was measured with an ellipsometer and found to be 48.3 nm. The relative permittivity of the insulated film was calculated to be 17.5, from the thus obtained electrostatic capacity and film thickness.

β Value

Figure 8:
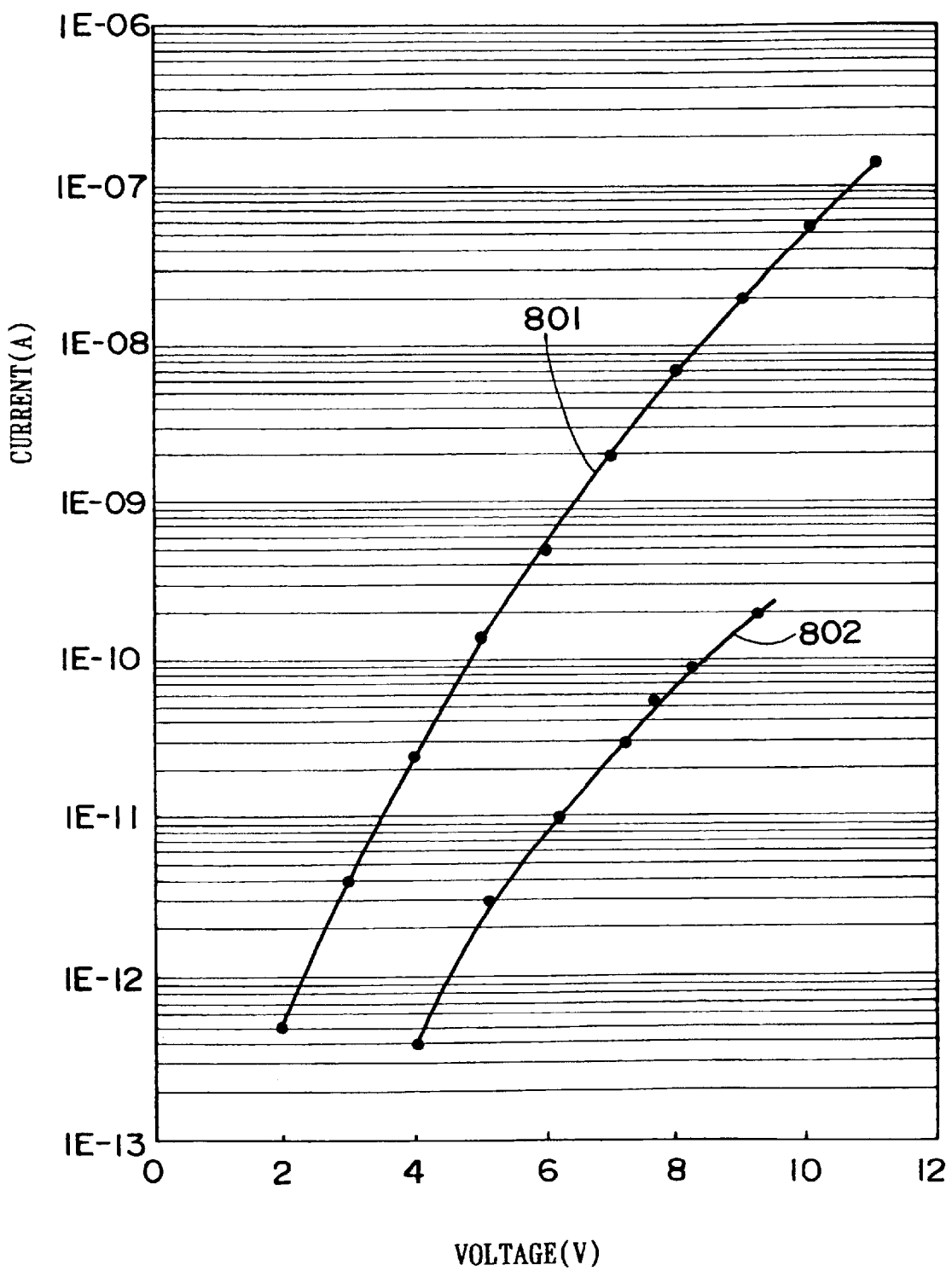
FIG. 8 is a graph of the relationship between applied voltage and current for MIM nonlinear elements in accordance with Example 1 of this invention and Comparative Example 4.

The voltage-current characteristic of this MIM nonlinear element was also measured, and the average values thereof were plotted to give the graph shown in FIG. 8. The curve denoted by reference number 801 in FIG. 8 is data for Example 1, and a nonlinear coefficient (β value) expressing the steepness of this curve was derived from the slope thereof and found to be 6.1.

r Value

To investigate the uniformity of elements, a voltage of 10 V was applied to five MIM nonlinear elements fabricated on the same substrate. The difference between the maximum and minimum values of logarithms of the currents (units: amperes) flowing through these elements was derived and found to be 0.24 (hereinafter, this value is called "r value"). Note that the following three levels are used in evaluating this r value:

◎ 0.5 or less
○ 0.5 to 1.0
x 1.0 or greater

The electrolytic conductivity of the electrolyte and the relative permittivity of the insulated film, β value, and r value are listed in Table 1.

When a liquid crystal display panel was fabricated by using MIM nonlinear elements formed by the above described method, a contrast of at least 100 was obtained over a temperature range of 0° C. to 80° C., and no display unevenness was discerned.

Comparative Example 1

An electrolyte of ethylene glycol with 2 wt % citric acid was used instead of the electrolyte of Example 1; otherwise, MIM nonlinear elements were fabricated in a similar manner to that of Example 1. The electrolytic conductivity of the electrolyte, the relative permittivity of the insulated film, β value, and r value of these MIM nonlinear elements were obtained in the same manner as that of Example 1. The results are listed in Table 1.

Examples 2 to 6 and Comparative Examples 2 and 3

The electrolytes listed below were used instead of the electrolyte of Example 1; otherwise, MIM nonlinear elements were fabricated in a similar manner to that of Example 1. In other words, an ethylene glycol solution comprising 9 wt % of diammonium maleate was used as the electrolyte for Example 2, an ethylene glycol solution comprising 10 wt % of diammonium malonate was used as the electrolyte for Example 3, a γ-butyrolactone solution comprising 10 wt % ammonium salicylate was used as the electrolyte for Example 4, an ethylene glycol solution comprising 10 wt % of ammonium nitrate was used as the electrolyte for Example 5, an ethylene glycol solution comprising 10 wt % of tetraethyl-ammonium vanadate was used as the electrolyte for Example 6, and an ethylene glycol solution comprising 2 wt % of diammonium tartrate was used as the electrolyte for Comparative Example 2. Water was used as the solvent for Comparative Example 3.

The electrolytic conductivity of the electrolyte and the relative permittivity of the insulated film, β value, and r value were obtained for each of the thus obtained MIM nonlinear elements, in a similar manner to Example 1. The results are listed in Table 1.

TABLE 1

| | Electrolyte | | Electrical Conductivity | Relative Permittivity | β | r |
|---|---|---|---|---|---|---|
| | Solute | Solvent | (mS/cm) | | Value | Value |
| E 1 | Ammonium salicylate | EG | 2.74 | 17.5 | 6.1 | ◎ |
| E 2 | Diammonium maleate | EG | 3.36 | 15.6 | 6.0 | ◎ |
| E 3 | Diammonium malonate | EG | 3.68 | 20.6 | 5.5 | ◎ |
| E 4 | Ammonium salicylate | GBL | 1.34 | 21.7 | 3.8 | ○ |
| E 5 | Ammonium nitrate | EG | 8.55 | 20.7 | 5.6 | ○ |
| E 6 | Tetraethyl-ammonium vanadate | EG | 1.0 | 20.6 | 5.7 | ○ |
| CE 1 | Citric acid | EG | 0.05 | 14.0 | 6.0 | x |
| CE 2 | Diammonium tartrate | EG | 0.05 | 14.0 | 6.0 | x |
| CE 3 | Citric acid | Water | 10 | 27.0 | 4.0 | ◎ |

E: Example; CE: Comparative Example; EG: ethylene glycol; GBL: γ-butyrolactone

As is clear from Table 1, it was determined that the relative permittivity of the insulated film was small and the β value which indicates the steepness of the voltage-current characteristic was sufficiently large, in each of these examples of the invention. It was also determined that, since the electrolytic conductivity of the electrolyte was sufficiently large in each of these examples of the invention, the r value thereof was small, in other words, a homogeneous oxide film can be obtained thereby.

In contrast thereto, the electrolytic conductivity of the electrolytes of Comparative Examples 1 and 2 were below the range of these examples. With Comparative Examples 1 and 2, it is true that the relative permittivity of the insulated film was small and the β values were sufficiently large, but there was a large dispersion in the voltage-current characteristics and both examples could only produce non-homogeneous oxide films wherein a r value was too large to be measured. When the usual drive voltage was applied to the elements obtained by Comparative Examples 1 and 2, some of the elements short-circuited and were destroyed. Comparative Example 3 had a worse β value than these examples of the invention.

The description now turns to separate experimental examples relating to the MIM nonlinear element of Example 1.

SIMS

Figure 9:
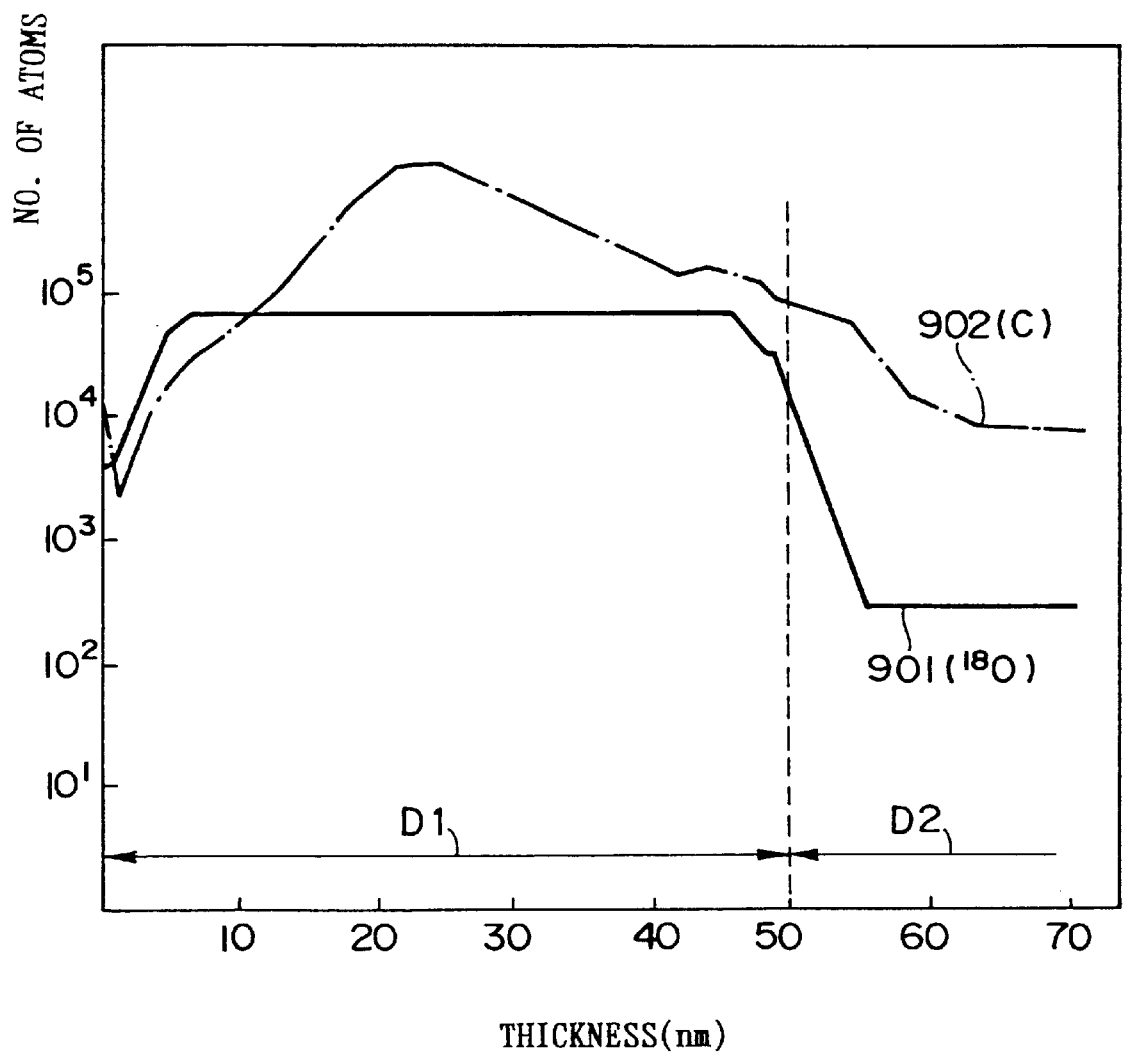
FIG. 9 shows the profiles of carbon atoms and oxygen atoms in the insulated film and first conductive film of an MIM nonlinear element in accordance with Example 1 of this invention, obtained by SIMS.

SIMS by cesium ion etching was first performed to obtain the profile of carbon atoms comprised within this insulated film, with the results being as shown in FIG. 9. Thickness from the insulated film surface towards the first conductive film is plotted along the horizontal axis in FIG. 9 and numbers of atoms (logarithmic) are plotted along the vertical axis. Reference number 901 denotes the profile of oxygen atoms ($^{18}O$), reference number 902 denotes the profile of carbon atoms, reference symbol D1 denotes the region of the insulated film, and reference symbol D2 denotes the partial region of the first conductive film.

It was determined from FIG. 9 that carbon atoms are distributed uniformly in the thickness depth direction through the insulated film. The quantity of carbon atoms was determined to be 0.2 to 100, in terms of the relative intensity thereof with respect to oxygen atoms ($^{18}O$).

Comparative Example 4

Figure 10:
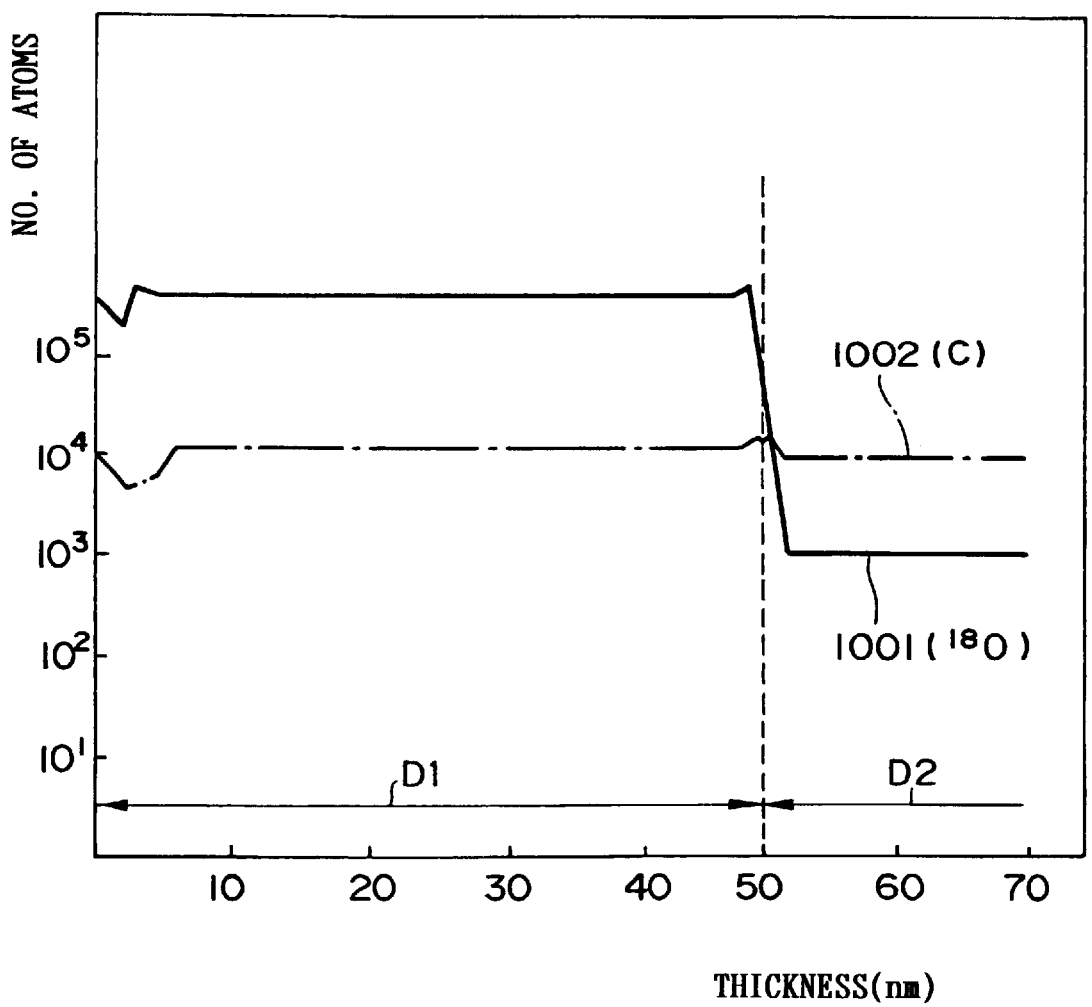
FIG. 10 shows the profiles of carbon atoms and oxygen atoms in the insulated film and first conductive film of an MIM nonlinear element of Comparative Example 4, obtained by SIMS.

An aqueous solution of 0.1 wt % of citric acid was used instead of the electrolyte of Example 1; otherwise, MIM nonlinear elements were fabricated in a similar manner to that of Example 1. The profiles of elements (carbon atoms and oxygen atoms $^{18}O$) within these MIM nonlinear elements were obtained by SIMS in the same manner as in Example 1, with the results being as shown in FIG. 10. Reference number 1001 in FIG. 10 denotes the profile of oxygen atoms ($^{18}O$), reference number 1002 denotes the profile of carbon atoms, reference symbol D1 denotes the region of the insulated film, and reference symbol D2 denotes the region of the first conductive film. It was determined from FIG. 10 that the relative intensity of carbon atoms in the insulated film was extremely low at approximately 0.01 to 0.1, in comparison with the oxygen atoms ($^{18}O$).

The relative permittivity of the insulated film and β value were obtained in a manner similar to that of Example 1, with the results being as listed in Table 2. Note that reference number 802 in FIG. 8 denotes the voltage-current characteristic curve for obtaining the β value of Comparative Example 4.

Examples 7 to 12 and Comparative Example 5

The electrolytes listed below were used instead of the electrolyte of Example 1; otherwise, MIM nonlinear elements were fabricated in a similar manner to that of Example 1. In other words, an ethylene glycol solution comprising 9 wt % of diammonium maleate was used as the electrolyte for Example 7, an ethylene glycol solution comprising 10 wt % of diammonium malonate was used as the electrolyte for Example 8, an ethylene glycol solution comprising 8 wt % of diammonium adipate was used as the electrolyte for Example 9, an ethylene glycol solution comprising 10 wt % of ammonium γ-resorcylate was used as the electrolyte for Example 10, an ethylene glycol solution comprising 10 wt % of ammonium benzoate was used as the electrolyte for Example 11, a γ-butyrolactone solution comprising 10 wt % ammonium salicylate was used as the electrolyte for Example 12, and an aqueous solution comprising 10 wt % of ammonium salicylate was used as the electrolyte for Comparative Example 5.

The relative permittivity of the insulated film and β value of each of the thus obtained MIM nonlinear elements were obtained in a manner similar to that of Example 1. The results are listed in Table 2.

TABLE 2

| | Electrolyte | | Relative | |
|---|---|---|---|---|
| | Solute | Solvent | Permittivity | β Value |
| E 1 | Ammonium salicylate | Ethylene glycol | 17.5 | 6.1 |
| E 7 | Diammonium maleate | Ethylene glycol | 16.0 | 6.0 |
| E 8 | Diammonium malonate | Ethylene glycol | 18.4 | 5.6 |
| E 9 | Diammonium adipate | Ethylene glycol | 13.2 | 5.7 |
| E 10 | ammonium γ-resorcylate | Ethylene glycol | 18.6 | 5.4 |

TABLE 2-continued

| | Electrolyte | | Relative | |
|---|---|---|---|---|
| | Solute | Solvent | Permittivity | β Value |
| E 11 | Ammonium benzoate | ethylene glycol | 15.8 | 4.3 |
| E 12 | Ammonium salicylate | γ-butyrolactone | 20.0 | 4.2 |
| CE 4 | Citric acid | Water | 27.0 | 3.8 |
| CE 5 | Ammonium salicylate | Water | 25.1 | 3.9 |

E: Example; CE: Comparative Example

As is clear from Table 2, it was determined that the relative permittivity of the insulated film was small and the β value which indicates the steepness of the voltage-current characteristic was sufficiently large, in each of these examples of the invention. In contrast thereto, it was determined that the relative permittivity of the insulated film of the comparative examples in which water was used as the solvent was higher than that of these examples, and also the β values thereof were lower.

Example 13

A 200-nm-thick tantalum film was deposited by sputtering on a glass substrate, to form a first conductive film. Using an ethylene glycol solution comprising 10 wt % of tetraethyl-ammonium borate as the electrolyte, electrolysis at constant current was then performed at a current density of 0.1 mA/cm$^2$ until the voltage reached 30 V, followed by electrolysis at constant voltage at 30 V for approximately two hours, to subject the tantalum film to anodic oxidation. As a result, a tantalum oxide film of a thickness of approximately 50 nm was formed.

Heat treatment at 430° C. was then performed in a nitrogen atmosphere, to stabilize the anodic oxide film (insulated film), then chromium was deposited by sputtering to a thickness of 150 nm on that insulated film to form the second conductive film, completing the MIM nonlinear element.

The description now turns to the experiment relating to this MIM nonlinear element.

Figure 11:
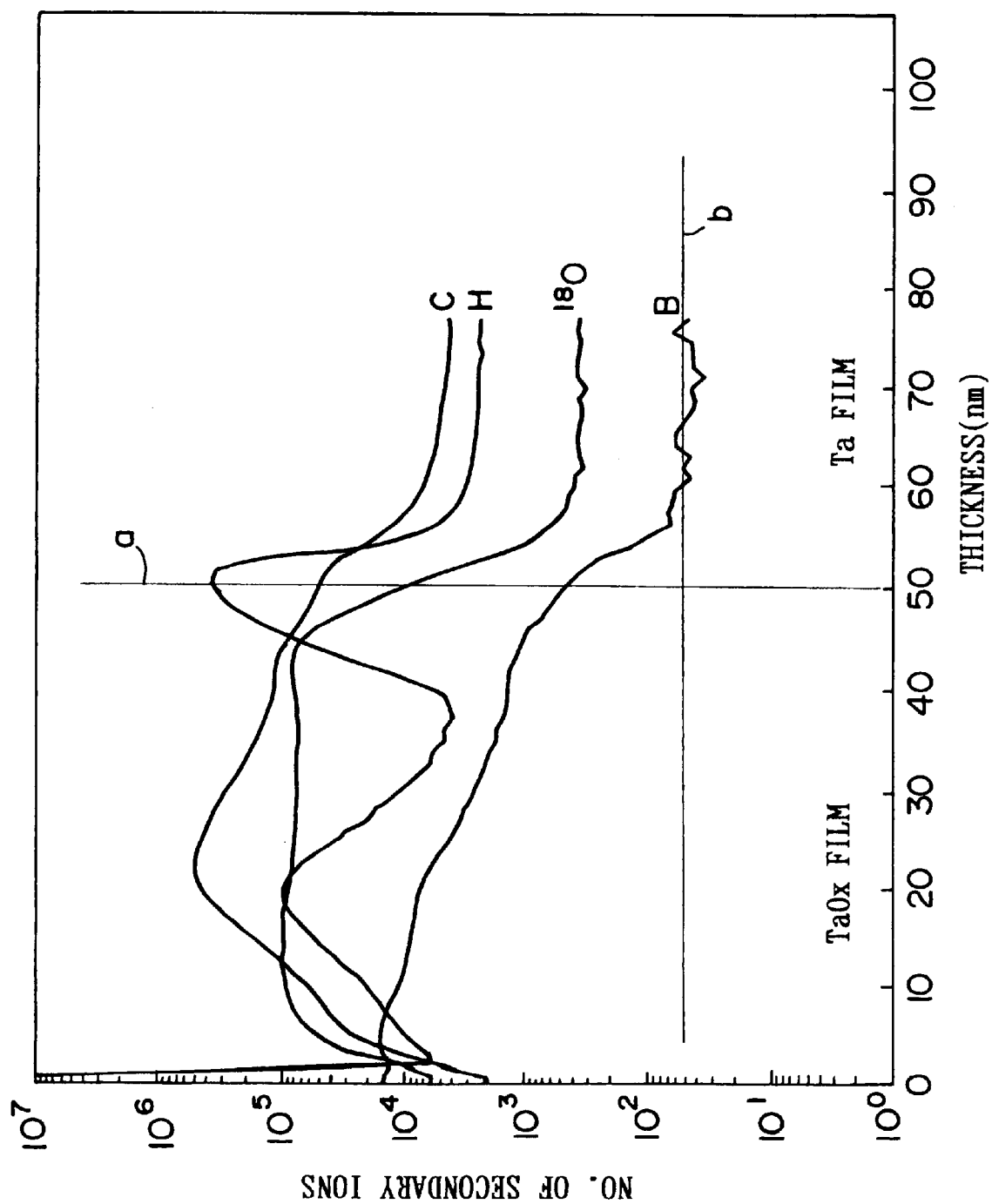
FIG. 11 shows the profiles of elements in the insulated film and first conductive film of an MIM nonlinear element in accordance with Example 12 of this invention, obtained by SIMS.

SIMS by cesium ion etching was first performed to obtain the profile of various atoms comprised within this insulated film and first conductive film, with the results being as shown in FIG. 11. Thickness from the insulated film surface towards the first conductive film is plotted along the horizontal axis in FIG. 11 and numbers of secondary ions are plotted along the vertical axis. Note that the line denoted by reference symbol a in FIG. 11 is the interface between the insulated film and the first conductive film, obtained by using the $^{18}O$ profile as reference.

It was determined from FIG. 11 that boron atoms are distributed uniformly in the thickness depth direction through the insulated film. The intensity (number of secondary ions) of boron atoms in the insulated film was determined to be approximately 5×10$^2$ to 2.5×10$^4$, the intensity of boron atoms in the first conductive film was determined to be approximately 5×10, with the ratio therebetween (the intensity in the insulated film with respect to the intensity in the first conductive film) being on the order of 10 to 5×10$^2$. Note that the intensity of boron in the first conductive film is indicated by the line denoted by reference symbol b in FIG. 11. It was also determined from FIG. 11 that carbon was comprised within the insulated film.

The relative permittivity of an MIM nonlinear element having a 4-μm square pattern, fabricated by the above described method, was determined in a similar manner to that of Example 1 and was found to be 17.1. The voltage-current characteristic of this MIM nonlinear element was also measured and the nonlinear coefficient (β value) indicating the steepness thereof was calculated to be 5.7.

The composition of the electrolyte, the relative permittivity of the insulated film and β value are listed in Table 3.

When a liquid crystal display panel was fabricated by using MIM nonlinear elements formed by the above described method, a contrast of at least 100 was obtained over a temperature range of 0° C. to 80° C., and no display unevenness was discerned.

Comparative Example 6

Figure 12:
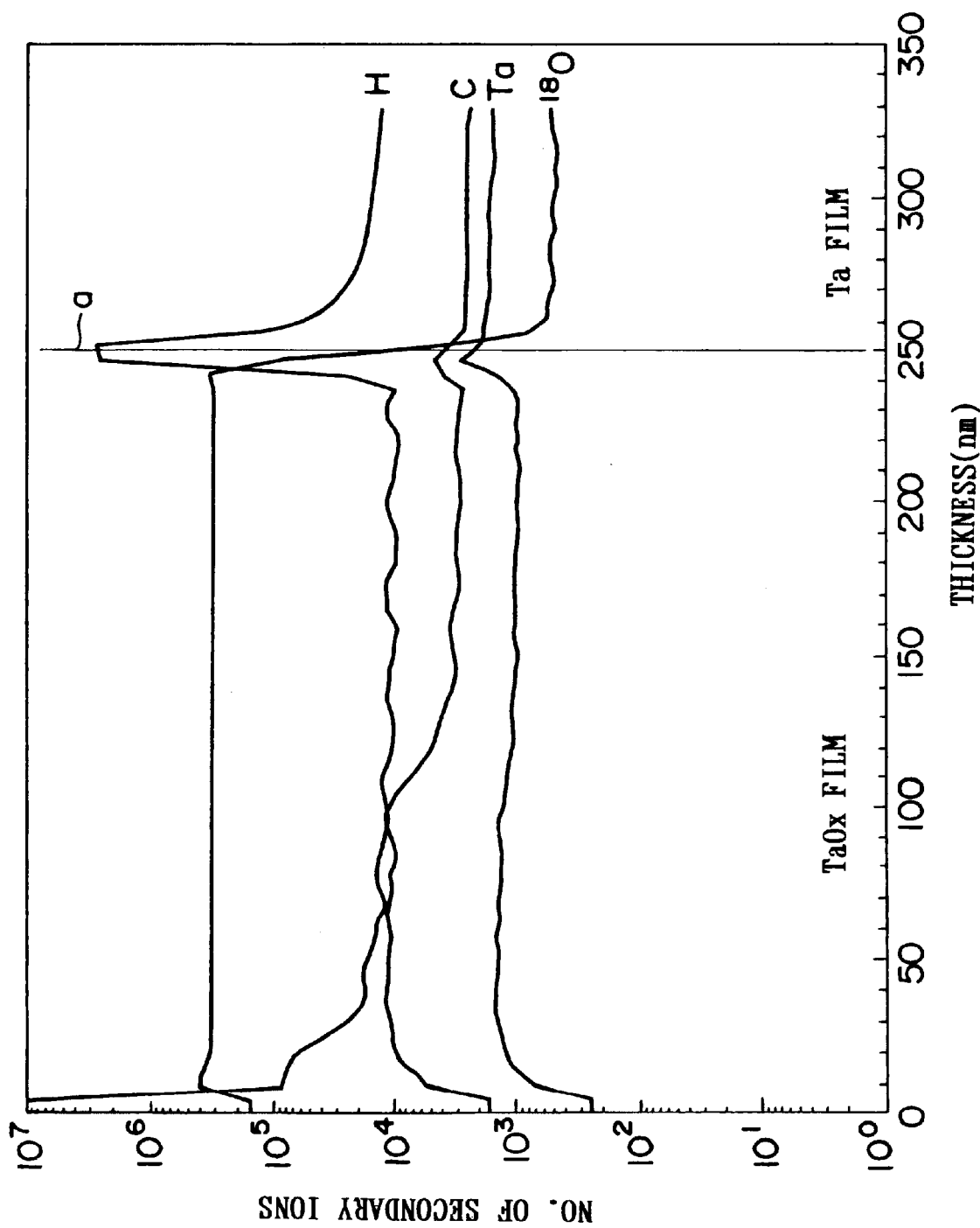
FIG. 12 shows the profiles of elements in the insulated film and first conductive film of an MIM nonlinear element of Comparative Example 6, obtained by SIMS.

An electrolyte that was an aqueous solution of 0.1 wt % citric acid was used instead of the electrolyte of Example 13; otherwise, MIM nonlinear elements were fabricated in a similar manner to that of Example 13. The profile of atoms in this MIM nonlinear element were obtained by SIMS in a similar manner to that of Example 13, with the results being as shown in FIG. 12. It was determined from FIG. 12 that additional elements belonging to families 3 to 7, other than carbon, were substantially not included into the insulated film. The relative permittivity of the insulated film and β value were obtained in a manner similar to that of Example 13, with the results being as listed in Table 3.

Examples 14 to 25 and Comparative Example 7

The electrolytes listed below were used instead of the electrolyte of Example 13; otherwise, MIM nonlinear elements were fabricated in a similar manner to that of Example 13. In other words, an ethylene glycol solution comprising 10 wt % of ammonium nitrate was used as the electrolyte for Example 14, an ethylene glycol solution comprising 10 wt % of tetraethyl-ammonium dihydrogen phosphate was used as the electrolyte for Example 15, an ethylene glycol solution comprising 10 wt % of tetraethylammonium sulfate was used as the electrolyte for Example 16, an ethylene glycol solution comprising 10 wt % of tetraethyl-ammonium vanadate was used as the electrolyte for Example 17, an ethylene glycol solution comprising 10 wt % of tetraethyl-ammonium chromate was used as the electrolyte for Example 18, an ethylene glycol solution comprising 10 wt % of tetraethyl-ammonium molybdate was used as the electrolyte for Example 19, an ethylene glycol solution comprising 10 wt % of tetraethyl-ammonium tungstate was used as the electrolyte for Example 20, an ethylene glycol solution comprising 10 wt % of tetraethyl-ammonium perrhenate was used as the electrolyte for Example 21, a γ-butyrolactone solution comprising 10 wt % of tetraethyl-ammonium dihydrogen phosphate was used as the electrolyte for Example 22, a γ-butyrolactone solution comprising 10 wt % of tetraethyl-ammonium tungstate was used as the electrolyte for Example 23, an ethylene glycol solution comprising 10 wt % of tetraethyl-ammonium silicate was used as the electrolyte for Example 24, an ethylene glycol solution comprising 10 wt % of tetraethyl-ammonium tungstate and 5.3 wt % of water was used as the electrolyte for Example 25, and an aqueous solution comprising 10 wt % of tetraethyl-ammonium tungstate was used as Comparative Example 7.

The relative permittivity of the insulated film and β value was obtained for each of the thus obtained MIM nonlinear elements, in a similar manner to that of Example 1. The results are listed in Table 3.

TABLE 3

| | Electrolyte | | Relative | |
|---|---|---|---|---|
| | Solute | Solvent | Permittivity | β Value |
| E 13 | Tetraethyl-ammonium borate | EG | 17.1 | 5.7 |
| E 14 | Ammonium nitrate | EG | 20.7 | 5.6 |
| E 15 | Tetraethyl-ammonium dihydrogen phosphate | EG | 12.9 | 6.0 |
| E 16 | Tetraethyl-ammonium sulfate | EG | 17.9 | 5.7 |
| E 17 | Tetraethyl-ammonium vanadate | EG | 18.4 | 5.7 |
| E 18 | Tetraethyl-ammonium chromate | EG | 20.7 | 5.9 |
| E 19 | Tetraethyl-ammonium molybdate | EG | 15.6 | 5.7 |
| E 20 | Tetraethyl-ammonium tungstate | EG | 13.8 | 5.5 |
| E 21 | Tetraethyl-ammonium perrhenate | EG | 16.4 | 5.7 |
| E 22 | Tetraethyl-ammonium dihydrogen phosphate | GBL | 20.8 | 4.1 |
| E 23 | Tetraethyl-ammonium tungstate | GBL | 21.1 | 4.5 |
| E 24 | Tetraethyl-ammonium silicate | EG | 15.7 | 5.0 |
| E 25 | Tetraethyl-ammonium tungstate | EG, water | 22.1 | 5.5 |
| CE 6 | Citric acid | Water | 27.0 | 4.3 |
| CE 7 | Tetraethyl-ammonium tungstate | Water | 27.0 | 4.3 |

E: Example; CE: Comparative Example; EG: ethylene glycol; GBL: γ-butyrolactone

As is clear from Table 3, it was determined that the relative permittivity of the insulated film was small and the β value indicating the steepness of the voltage-current characteristic was sufficiently large, in each of these examples of the invention. In contrast thereto, the relative permittivity of the insulated film in each of the comparative examples was higher than in these examples of the invention and also the β value was lower.

Example 26

A 200-nm-thick tantalum film was deposited on a glass substrate by sputtering to form the first conductive film. Using an ethylene glycol solution comprising 10 wt % of ammonium salicylate and 7 wt % of water as the electrolyte, electrolysis at constant current was then performed at a current density of 0.1 mA/cm$^2$ until the voltage reached 30 V, followed by electrolysis at constant voltage at 30 V for approximately two hours, to subject the tantalum film to anodic oxidation. As a result, a tantalum oxide film of a thickness of approximately 50 nm was formed.

Heat treatment at 400° C. was then performed in a nitrogen atmosphere to stabilize the anodic oxide film (insulated film), then chromium was deposited by sputtering to a thickness of 150 nm on that insulated film to form the second conductive film, completing the MIM nonlinear element.

The relative permittivity of the insulated film of an MIM nonlinear element having a 4-μm square pattern, fabricated by the above described method, was determined in a similar manner to that of Example 1 and was found to be 24.3. The voltage-current characteristic of this MIM nonlinear element was also measured and the nonlinear coefficient (β value) indicating the steepness thereof was calculated to be 5.5.

To observe changes with time of the voltage-current characteristic of the thus obtained MIM nonlinear element, the shift value indicating changes with time was obtained and was found to be 1.4%. This shift value is defined as the value $I_S$ in the equation below, when a rectangular-waveform voltage of a polarity that changes every second was applied to the MIM nonlinear element. During this time, the applied voltage was set so that the current was $1\times10^{-7}$ A for each pixel of the liquid crystal display panel.

$$I_S=\{(I_{100}-I_0)/I_0\}\times100(\%)$$

In this equation, $I_0$ is the initial (1 second) current and $I_{100}$ is the current after 100 seconds.

The water content of the electrolyte, the β value, relative permittivity of the insulated film, shift value, and the pH of the electrolyte are listed in Table 4.

When a liquid crystal display panel was fabricated by using MIM nonlinear elements formed by the above described method, a contrast of at least 100 was obtained over a temperature range of 0° C. to 80° C., and no after-images were discerned.

Examples 27 to 29 and Comparative Examples 8 and 9

Electrolyte including water in the proportions listed below was used instead of the electrolyte of Example 26; otherwise, MIM nonlinear elements were fabricated in a similar manner to that of Example 26. In other words, the proportion of water used for Example 27 was 5 wt %, the proportion of water used for Example 28 was 3 wt %, the proportion of water used for Example 29 was 10 wt %, the proportion of water used for Comparative Example 8 was 100 wt %, and the proportion of water used for Comparative Example 9 was 0.1 wt %.

The β value, relative permittivity of the insulated film, and shift value were obtained for each of the thus obtained MIM nonlinear elements, in a similar manner to Example 26. The results are listed in Table 4, together with the water content and pH of each electrolyte.

Example 30

An electrolyte of ethylene glycol comprising 10 wt % of ammonium hydrogen phthalate and 5 wt % of water was used instead of the electrolyte of Example 26; otherwise, MIM nonlinear elements were fabricated in a similar manner to that of Example 26. The β value, relative permittivity of the insulated film, and shift value were obtained for the thus obtained MIM nonlinear element, in a similar manner to Example 26. The results are listed in Table 4, together with the water content and pH of each electrolyte.

TABLE 4

| | Water Content (wt %) | β Value | Relative Permittivity | Shift Value (%) | pH |
|---|---|---|---|---|---|
| E 26 | 7 | 5.5 | 24.3 | 1.4 | 6.4 |
| E 27 | 5 | 5.6 | 21.6 | 2.3 | 6.4 |
| E 28 | 3 | 5.6 | 20.8 | 26.0 | 6.4 |
| E 29 | 10 | 5.4 | 19.8 | 11.9 | 4.6 |
| E 30 | 5 | 5.2 | 20.0 | 3.8 | 6.4 |
| CE 8 | Aqueous solution | 4.0 | 27.0 | 3.0 | 4.9 |
| CE 9 | 0.1 | 5.2 | 18.1 | Measurement impossible | 6.4 |

E: Example; CE: Comparative Example

As is clear from Table 4, it was determined that the relative permittivity of the insulated film was small the β value indicating, the steepness of the voltage-current characteristic was sufficiently large, and also the shift value indicating changes with time in the voltage-current characteristic was sufficiently small, in each of these examples of the invention. In contrast thereto, since the water content of the electrolyte of Comparative Example 8 was too high, the shift value was small, but the relative permittivity increased. The water content for Comparative Example 9 was too low, so the β value was large and also the shift value was so large it could not be measured.

Example 31

MIM nonlinear element of the back-to-back structure shown in FIGS. 6 and 7 were used for this example. More specifically, a 150-nm-thick film of tantalum was deposited by sputtering on a glass substrate and was patterned to form the first conductive film. Using an electrolyte of ethylene glycol comprising 10 wt % of triethyl-methyl-ammonium tungstate and 1.1 wt % of water (pH: 11.1), fixed-current electrolysis was then performed at a current density of 0.04 mA/cm$^2$ until the voltage reached 15 V, to subject the tantalum film to anodic oxidation. As a result, a tantalum oxide film of a thickness of approximately 30 nm was formed.

After heat treatment was performed at 400° C. in a nitrogen atmosphere for 30 minutes, the anodic oxide film was cooled in the atmosphere. After the anodic oxide film (insulated film) had been stabilized, chromium was deposited by sputtering to a thickness of 100 nm on that insulated film and then was patterned to form the second conductive film. The portions of the first conductive film that form the MIM nonlinear element and the portions thereof that would become the signals lines were separated by etching, completing the MIM nonlinear element.

Example 32

An electrolyte comprising water in a proportion of 4.3 wt % was used instead of the electrolyte of Example 31; otherwise, MIM nonlinear elements were fabricated in a similar manner to that of Example 31.

Example 33

The voltage during the anodic oxidation was 16 V, the heat treatment after the anodic oxidation was at 350° C. for 30 minutes, then steam was introduced during the cooling; otherwise MIM nonlinear elements were fabricated in a similar manner to that of Example 31.

Comparative Example 10

An electrolyte comprising water in a proportion of 11.1 wt % was used instead of the electrolyte of Example 31; otherwise MIM nonlinear elements were fabricated in a similar manner to that of Example 31.

The description now turns to experiments relating to the MIM nonlinear elements of Examples 31 to 33 and Comparative Example 10.

SIMS

Example 31

Figure 13:
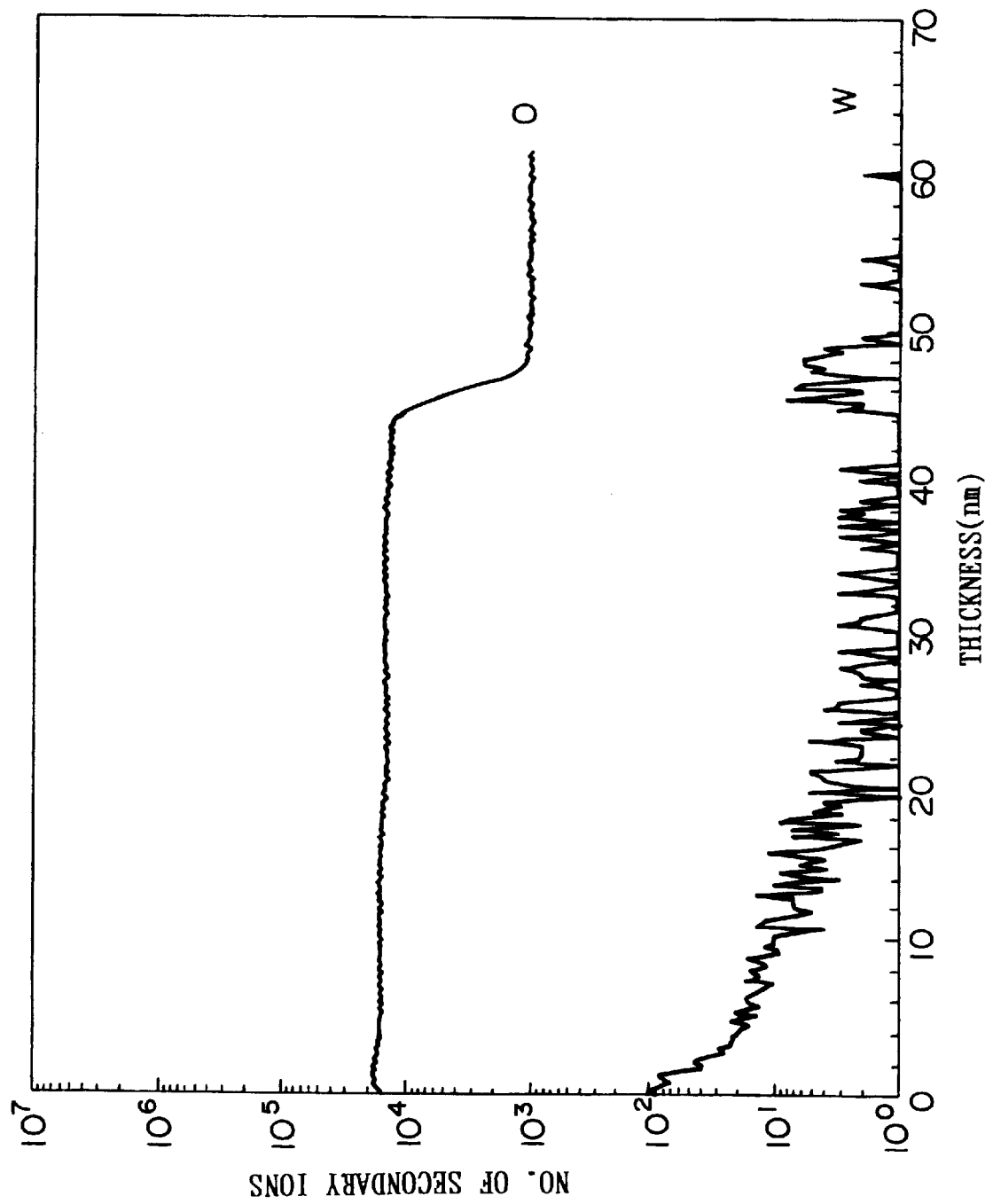
FIG. 13 shows a SIMS spectrum obtained for an MIM nonlinear element in accordance with Example 30 of this invention.

SIMS by cesium ion etching was first performed to obtain the profile of various atoms comprised within each insulated film and first conductive film, with the results being as shown in FIG. 13. Thickness from the insulated film surface towards the first conductive film is plotted along the horizontal axis in FIG. 13 and numbers of secondary ions are plotted along the vertical axis. For this SIMS analysis, the thickness of the insulated film (oxide film) was set to 45 nm to make the data easier to see.

From the spectrum shown in FIG. 13, it was determined that tungsten had permeated continuously from the surface of the insulated film formed by anodic oxidation as far as approximately halfway through the thickness of this insulated film in the MIM nonlinear element of Example 31. Note that it was also determined that the proportion of the solute within the electrolyte that permeated into the insulated film is ordinarily constant, no matter how the thickness of the insulated film changes.

Examples 31 to 33 and Comparative Example 10

Drift Value

To observe the changes with time of the voltage-current characteristics of the MIM nonlinear elements of Examples 31 to 33, the drift values indicating these changes with time were obtained while a direct current was applied, and were found to be 0.33 V, 0.32 V and 0.23 V.

These drift values were obtained by measuring the current-voltage curve twice for each MIM nonlinear element, defining the resultant voltages as V1 (first measured value) and V2 (second measured value) at a current of $1\times10^{-10}$ A, then obtaining the difference therebetween: $\Delta V = V2 - V1$.

The drift value was obtained in a similar manner for Comparative Example 10 and was found to be 0.59 V.

Shift Value

To observe the changes with time of the voltage-current characteristics of the MIM nonlinear elements of Examples 31 to 33, the shift values that indicate changes with time obtained therefor while an alternating voltage was applied thereto in a similar manner to that of Example 26, and were found to be −15.3%, −14.5%, and 2.3%. When the shift value was obtained for Comparative Example 10 in a similar manner, it was −18.4%.

β Value

The voltage-current characteristics of the MIM nonlinear elements of Examples 31 to 33 were measured and the nonlinear coefficients (β values) indicating the steepness thereof were calculated to be 6.0, 6.7, and 7.6. When the β value was obtained for Comparative Example 10 in a similar manner, it was 6.5.

Relative Permittivity

The relative permittivities of the MIM nonlinear elements of Examples 31 to 33 were obtained in a similar manner to that of Example 1, and were found to be 17.7, 20.5 and 20.5. When the relative permittivity was obtained for Comparative Example 10 in a similar manner, it was 21.2.

The β value, drift value, shift value, and the relative permittivity of each insulated film obtained from the above experimental examples are listed in Table 5, together with the water content and pH of the electrolyte. Note that I (4 V) in Table 5 indicates currents obtained when a voltage of 4 V was applied to the MIM nonlinear elements and I (10 V) indicates currents obtained when a voltage of 10 V was applied thereto.

TABLE 5

| | Water Content (wt %) | pH | I (4 V) | I (10 V) | β Value | Drift Value | Shift Value (%) | Relative Permittivity |
|---|---|---|---|---|---|---|---|---|
| E 31 | 1.1 | 11.1 | 1.3E-11 | 2.1E-8 | 6.0 | 0.33 (V) | −15.3 | 17.7 |
| E 32 | 4.3 | 10.5 | 4.5E-12 | 1.4E-8 | 6.7 | 0.32 (V) | −14.5 | 20.5 |
| E 33 | 4.0 | 10.5 | 6.0E-14 | 4.7E-10 | 7.6 | 0.23 (V) | 2.3 | 20.5 |
| CE10 | 11.1 | 9.8 | 2.1E-12 | 5.6E-9 | 6.5 | 0.59 (V) | −18.4 | 21.2 |

E: Example; CE: Comparative Example

As is clear from Table 5, it was determined that the relative permittivity of the insulated film was small, the β value indicating the steepness of the voltage-current characteristic was sufficiently large, and also the drift value and shift value both indicating changes with time in the voltage-current characteristic were sufficiently small, in each of these examples of the invention. In contrast thereto, since the water content of the electrolyte of Comparative Example 10 was too high, so the relative permittivity increased, the drift value and shift value also increased, and the changes with time of the voltage-current characteristic increased.

When a liquid crystal display panel was fabricated by using the MIM nonlinear elements of Examples 31 to 33, a contrast of at least 100 was obtained over a temperature range of 0° C. to 80° C., and no display unevenness was discerned.

Note that it was determined that the electrolytic conductivity of the electrolyte used in Examples 7 to 33 of this invention were within the range of the electrolytic conductivity of this invention.

What is claimed is:

1. A method of using an electrolyte for fabricating a two-terminal nonlinear element comprising a first conductive film, an insulated film and a second conductive film, wherein said electrolyte comprises an organic solvent, water in a proportion of 1 to 10 wt % and a solute and has electrolytic conductivity being greater than or equal to 1 mS/cm but less than or equal to 100 mS/cm, said first conductive film is of tantalum or a tantalum alloy, and said insulated film has a relative permittivity of 10 to 25, comprising the step of:
   using said electrolyte to form said insulated film by anodic oxidation of said first conductive film, said anodic oxidation being at a current density of 0.01 to 0.1 mA/cm².

2. The method as defined in claim 1,
   wherein said solute comprises at least one of a carboxylate and a salt of inorganic oxoacid.

3. The method as defined in claim 2,
   wherein said carboxylate is at least one salt of carboxylic acids selected from the group consisting of aromatic carboxylic acids and aliphatic dicarboxylic acids having no hydroxyl groups.

4. The method as defined in claim 3,
   wherein said carboxylate is at least one type selected from the group consisting of salicylates, resorcylates, benzoate, phthalates, malonates, maleates, and adipates.

5. The method as defined in claim 2,
   wherein the central atom of the oxoacid in said salt of an inorganic oxoacid is an atom belonging to one of families 3 to 7 of the periodic table.

6. The method as defined in claim 5,
wherein said salt of an inorganic oxoacid is at least one type selected from the group of nitrates, vanadates, phosphates, chromates, tungstates, molybdates, silicates, perrhenates, borates and sulfates.

7. The method as defined in claim 1,
wherein said organic solvent is at least one of ethylene glycol and γ-butyrolactone.

8. The method as defined in claim 1,
wherein said solute comprises at least a tungstate.

9. The method as defined in claim 8,
wherein said tungstate is at least one type of primary, secondary, tertiary, and quartenary ammonium salt.

10. The method as defined in claim 1,
wherein said solute comprises at least an aromatic carboxylate.

11. The method as defined in claim 10,
wherein said aromatic carboxylate is at least one of salicylate and phthalate.

12. The method as defined in claim 1,
wherein said insulated film comprises carbon atoms through an entire thickness direction of said insulated film.

13. The method as defined in claim 12,
wherein a relative intensity of said carbon atoms with respect to oxygen atoms ($^{18}O$) is 0.2 to 1000 throughout the entire thickness direction of said insulated film, as determined by elemental analysis obtained by secondary ion mass spectrometry (SIMS) by irradiation of cesium primary ions.

14. The method as defined in claim 1,
wherein said insulated film comprises at least one element belonging to families 3 to 7 of the periodic table distributed through the entire thickness direction of said insulated film.

15. The method as defined in claim 14,
wherein a relative intensity of said at least one element in said insulated film belonging to families 3 to 7 of the periodic table is at least 10 times the intensity of said element in said first conductive film, as determined by elemental analysis obtained by secondary ion mass spectrometry (SIMS) by irradiation of cesium primary ions.

* * * * *

UNITED STATES PATENT AND TRADEMARK OFFICE
CERTIFICATE OF CORRECTION

PATENT NO. : 6,663,760 B2
DATED : December 16, 2003
INVENTOR(S) : Takashi Inoue et al.

It is certified that error appears in the above-identified patent and that said Letters Patent is hereby corrected as shown below:

<u>Title page,</u>
Item [73], Assignee, "Seiko Epson Corporation, Tokyo (JP)" should read
-- Seiko Epson Corporation, Tokyo (JP), Mitsubishi Chemical Corporation, Tokyo, (JP) --

Signed and Sealed this

Twenty-fifth Day of May, 2004

JON W. DUDAS
*Acting Director of the United States Patent and Trademark Office*